US006636181B2

(12) United States Patent
Asano et al.

(10) Patent No.: US 6,636,181 B2
(45) Date of Patent: Oct. 21, 2003

(54) TRANSMITTER, COMPUTER SYSTEM, AND OPENING/CLOSING STRUCTURE

(75) Inventors: Takeshi Asano, Atsugi (JP); Kazuo Masuda, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/021,845

(22) Filed: Dec. 13, 2001

(65) Prior Publication Data

US 2002/0113741 A1 Aug. 22, 2002

(30) Foreign Application Priority Data

Dec. 26, 2000 (JP) .......................................... 2000-394662

(51) Int. Cl.[7] ................................................. H01Q 1/24
(52) U.S. Cl. ....................................... 343/702; 343/770
(58) Field of Search .......................... 343/702, 700 MS, 343/767, 770, 725, 729, 727, 726, 730, 803; H01Q 1/24

(56) References Cited

U.S. PATENT DOCUMENTS

| 5,668,561 | A | * | 9/1997 | Perrotta et al. | ............. | 343/702 |
| 5,677,698 | A | * | 10/1997 | Snowdon | ..................... | 343/702 |
| 5,822,705 | A | * | 10/1998 | Lehtola | ........................ | 343/702 |
| 5,920,293 | A | * | 7/1999 | Perrotta et al. | ............. | 343/702 |
| 5,943,021 | A | * | 8/1999 | Hayes et al. | ................. | 343/702 |
| 6,288,493 | B1 | | 9/2001 | Lee et al. | .................... | 343/895 |
| 6,339,400 | B1 | * | 1/2002 | Flint et al. | ................... | 343/702 |

* cited by examiner

Primary Examiner—Hoanganh Le
(74) Attorney, Agent, or Firm—Carlos Munoz-Bustamante

(57) ABSTRACT

A portable device having a base member and a hingedly attached lid member does not require a signal cable to transmit a high-frequency signal between the base unit and the lid. While the lid of the lap-top PC is closed, a radio device installed in the base unit transmits a high-frequency signal from a first antenna to a second antenna, the signal is then output from a signal cable attached third antenna to the atmosphere. The device structured as described above can transmit the high-frequency signal in a non-contact manner between the antenna of the base unit and the antenna of the lid in such a way that there is no need to provide a signal cable between the base unit part and the lid part.

18 Claims, 20 Drawing Sheets

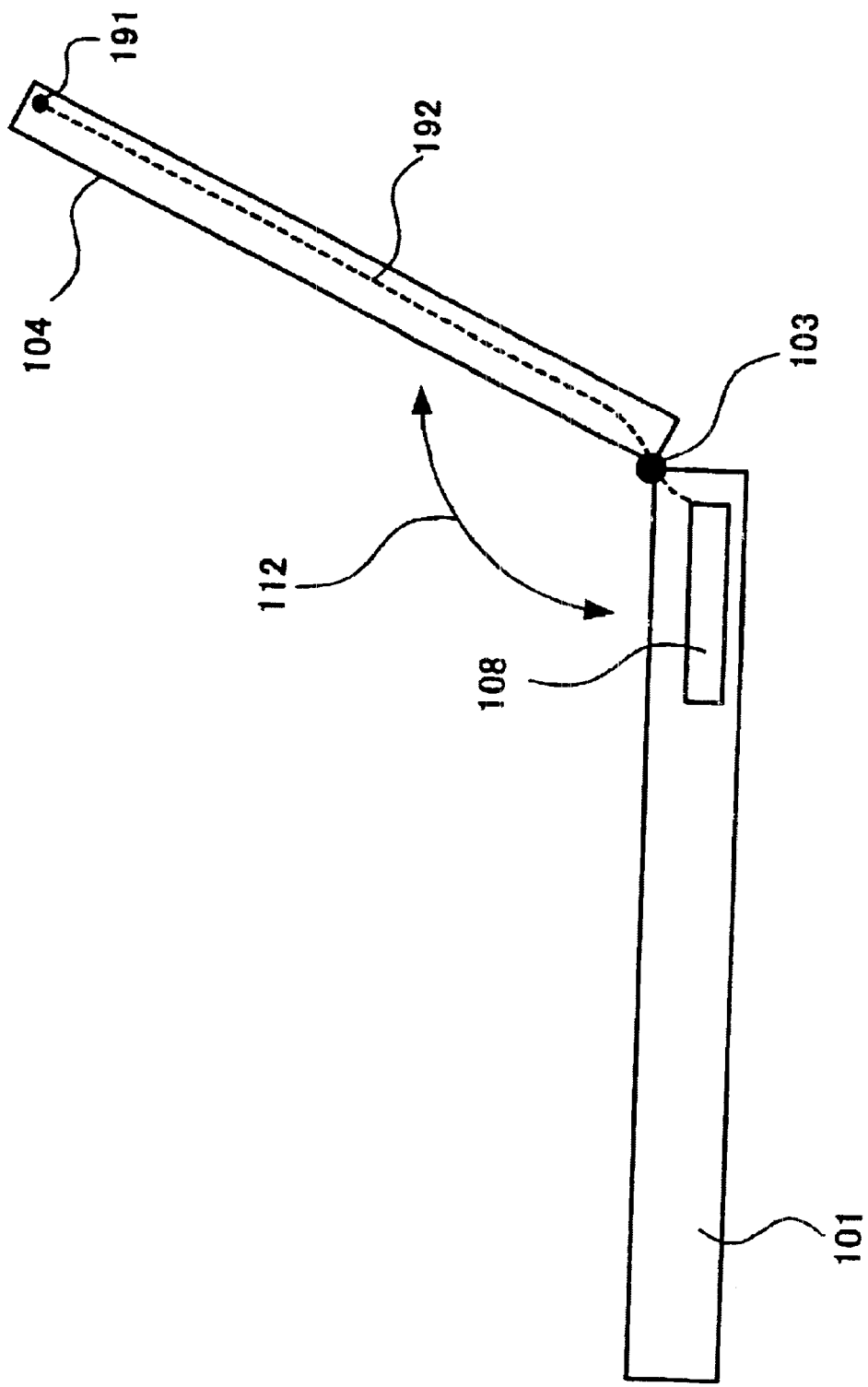
FIG. 20 --Prior Art--

TRANSMITTER, COMPUTER SYSTEM, AND OPENING/CLOSING STRUCTURE

BACKGROUND OF THE INVENTION

The present invention relates to a transmitter, a computer system, and an opening/closing structure. More particularly, the present invention relates to a technique for transmitting a high-frequency signal or energy efficiently through a movable part or portion.

Some general electrical apparatus are configured by a base unit and a door/lid attached to the base unit respectively. And, for some electric apparatus, the door/lid is provided with a display, an input device, and an antenna respectively. FIG. 19 shows a schematic structure of a lap-top personal computer (PC). FIG. 20 shows a cross sectional view of the lap-top PC shown in FIG. 19. Generally, a lap-top PC has a base unit part 101 and a lid part 104 attached to the base unit part 101 by movable joints 103. The base unit part 101 is provided with, for example, a keyboard 102, a mother board (not illustrated), etc. The lid part 104 is provided with a flat-surface display 105, etc. When the lap-top PC has such a structure, the lid part 104 can be opened and closed to the base unit part 101 when the PC is not used and/or it is carried about, for example. The opening angle of the lid part 104 can be adjusted so as to make it easier to watch the flat-surface display screen.

When the lap-top PC is structured as shown in FIG. 19, the lid part 104 is provided with an antenna 191. The antenna 191 is used, for example, for a wireless link for the PC to such a communication network as a LAN (Local Area Network). Otherwise, the antenna 191 is used to send/receive data to adopt (accommodate) the Bluetooth standards, etc. A radio device 108 is installed in the base unit part 101. The radio device sends/receives a high-frequency signal to/from the antenna 191. The reason why the radio device 108 is installed in the base unit part 101 is to meet the requirement mainly for thinning the lid part 104 more in structure or for making it easy to install the radio device 108 in the base unit part 101. Therefore, the radio device 108 installed in the base unit part 101 must be coupled to the antenna 191 in some way. A signal cable 192 is usually used for the connection between the antenna 191 and the radio device 108. And, the signal cable 192 is usually a thin coaxial cable. The cable is laid by passing through a movable joint 103 so as to improve external appearance and reliability.

However, the above structure is confronted with the following problems when the signal cable 192 passes through a movable joint 103. Because the signal cable 192 passes through a movable joint attaching the lid part 104, or because it passes very close to the joint, the signal cable 192 itself is required to be thin and flexible. And, such a PC structure will eventually damage the signal cable as the lid part is opened and closed repetitively.

When such a thin and flexible signal cable 192 is bent repetitively, the dielectric material properties of the cable might be changed, thereby, the cable's electromagnetic wave transmission loss (usually in a microwave frequency band) is likely to increase. In addition, the transmission loss might be increased at the bent portion of the signal cable 192, although the loss depends on the bending angle.

And, in order to pass the signal cable 192 through a movable joint 103 in such a way, meticulous care must be used during the assembly process and accordingly, complicating the assembly process.

The above-described problems will also arise from electrical apparatus other than such lap-top personal computer. Concretely, when a signal cable is used to connect the base unit part to the lid part in a lap-top PC provided with such the base unit and the lid, the signal cable is often damaged due to the repetitive bending just like in the above case.

Under such circumstances, it is an purpose of the present invention to provide an electrical apparatus configured so as to avoid such the cable damage and other problems caused by the transmission structure that uses a signal cable for transmitting a high-frequency signal unavoidably between the base unit part and the lid part or door part.

SUMMARY OF THE INVENTION

The basic concept of the present invention is realized by a technique that a pair of antennas are disposed closely to each other, thereby a high-frequency signal or energy is transmitted at a low transmission loss between those antennas. The present invention employs such a transmission structure that uses a pair of antennas disposed closely to each other instead of the conventional method that uses a signal cable for transmitting an electrical signal and uses a connector for connection of such a signal. Hereinafter, the outline of the present invention will be described.

The transmitter of the present invention includes a first antenna and a second antenna disposed so as to face the first antenna and be separated therefrom. A high-frequency signal or energy is transmitted between the first and second antennas. The distance between the first and second antennas is decided to be $\lambda/8$ or under ($\lambda$: a wavelength of the high-frequency signal or energy) or the imaginary part of the mutual impedance between the first and second antennas is decided to be actually 0. In this specification, the high-frequency is defined as a frequency (over the VHF band) of 10 MHz, for example, 30 MHz or over.

In the transmitter, the second antenna is attached to the lid or door that opens/closes to the base unit to which the first antenna is coupled. While the lid or door is closed, the second antenna is disposed so as to face the first antenna. The first and second antennas may be dipole antennas, folded antennas, or slot antennas. The slot antenna is at times referred to as a slit antenna.

In the transmitter, the second antenna is disposed on a coaxial cylinder whose axis is assumed to be the center of the first antenna rotationally on the concentric cylinder around the axis. At this time, the first antenna may be a dipole antenna or cylindrical slot antenna (slit antenna) and the second antenna may be a dipole antenna, folded antenna, or cylindrical slot antenna (slit antenna).

In the transmitter, a radio device or signal generator may be coupled to the first antenna and a third antenna or signal processor may be coupled to the second antenna via a signal cable.

The transmitter may be employed for a lap-top computer system. It may also be employed for such an opening/closing structure as a door, etc.

BRIEF DESCRIPTION OF THE DRAWINGS

Some of the purposes of the invention having been stated, others will appear as the description proceeds, when taken in connection with the accompanying drawings, in which:

FIG. 20 is a cross sectional view of the lap-top personal computer shown in FIG. 19.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings. Note that the same numbers will be used for the same elements in all the embodiments.

First Embodiment

Figure 1:
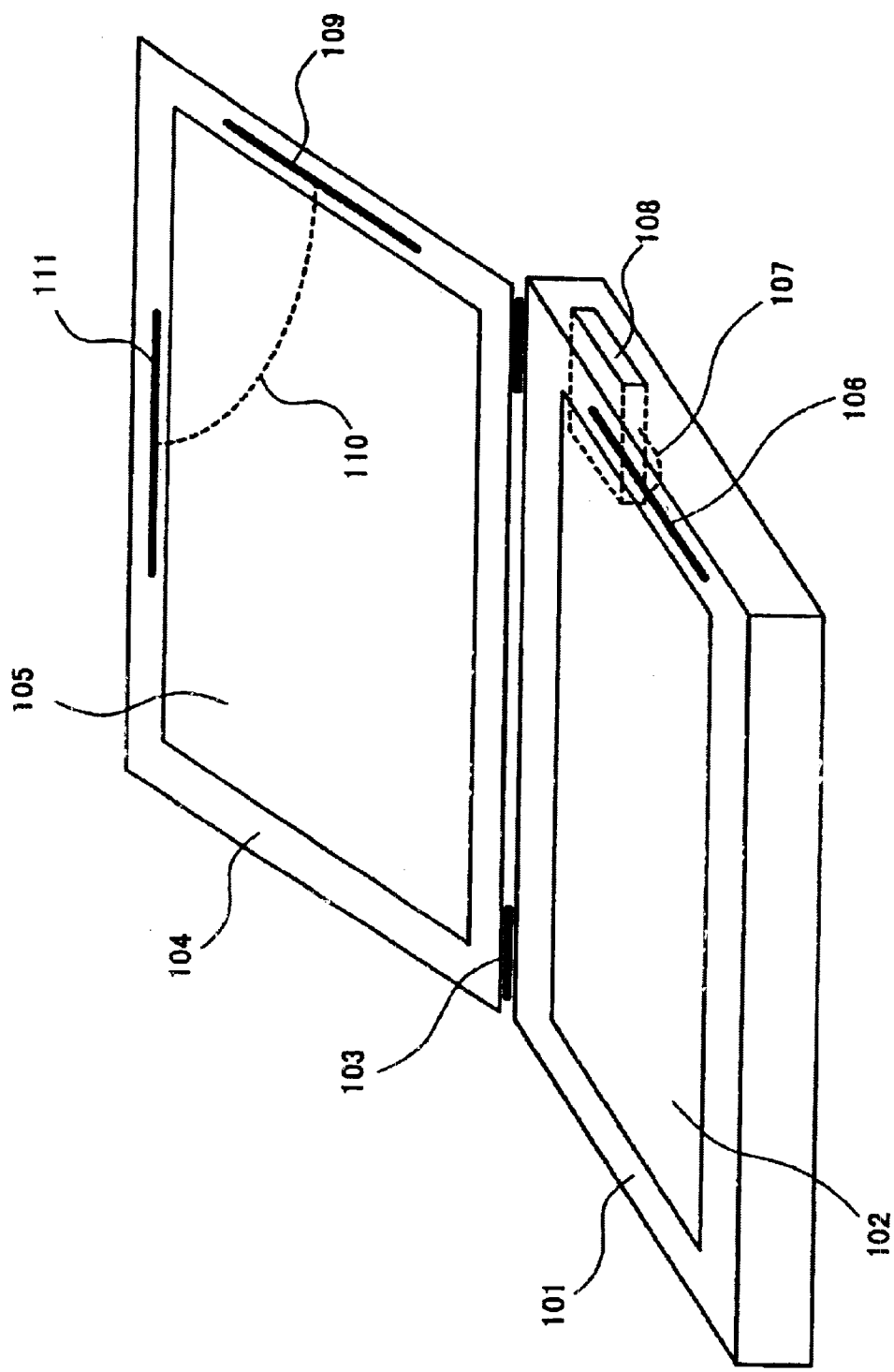
FIG. 1 is a schematic whole perspective view of a computer system in an embodiment of the present invention.
Figure 2:
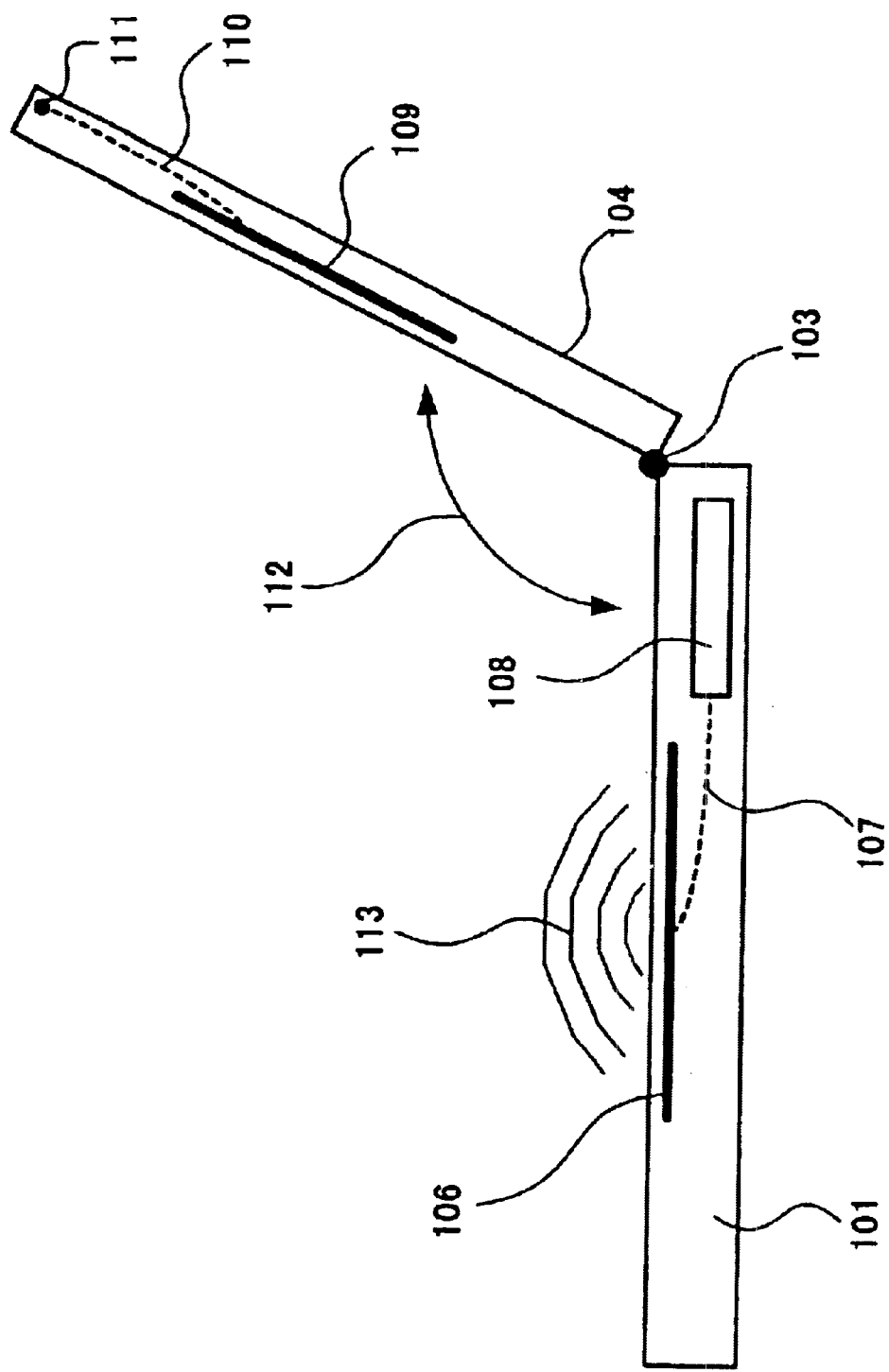
FIG. 2 is a cross sectional view of the computer system shown in FIG. 1.

FIG. 1 is a schematic perspective view of a computer system as a whole in this first embodiment of the present invention. FIG. 2 is a schematic cross sectional view of the computer system shown in FIG. 1. The computer system in this embodiment is a lap-top personal computer while there are many other examples.

The lap-top personal computer shown in FIG. 1 is configured by a base unit part 101 and a lid part 104. The base unit part has a keyboard 102; a mother board (not illustrated); a hard disk drive; a CD-ROM drive; a floppy disk drive, etc. The lid part 104 is configured by such a flat surface display 105 as a liquid crystal display and its peripheral or support circuits, etc. The housings of the base unit part 101 and the lid part 104 are formed with such resin as ABS, etc. or such a light-weight alloy as a magnesium alloy, etc.

The base unit part 101 and the lid part 104 are coupled to each other by movable joints 103. The lid part 104 can be opened and closed in the movable direction 112. The movable joints 103 may be any that function as hinges.

In this first embodiment, the base unit part 101 is provided with a radio device (transmitter/receiver assembly) 108 for generating proper signals used to communicate with another computer system and peripheral devices and a first antenna 106 coupled to the radio device 108 via a signal cable 107. The lid part 104 is provided with a second antenna 109 and a third antenna 111 coupled to the second antenna 109 via a signal cable.

The first antenna 106 is disposed around the top surface of the base unit part 101. This is to externally radiate the signal wave more efficiently and make the electromagnetic coupling to the second antenna 109 more effective; this will be described later. The second antenna 109 is attached to the lid part 104, closer to the base unit part 101. This is to make the electromagnetic coupling to the first antenna 106 more effective; this will also be described subsequently. The third antenna 111 is disposed around the upper side of the lid part 104. This is to improve the external radiation efficiency of the signal wave.

When the PC takes a structure shown in FIG. 1 or FIG. 2, the PC uses (½)$\lambda$ dipole antennas as the first to third antennas described above. $\lambda$ denotes the wavelength of the transmission signal. While the lid part 104 is closed, the first antenna 106 and the second antenna 109 are disposed at a distance of (⅛)$\lambda$ or $\lambda/8$ of the operating frequency or under therebetween. For example, when the 2.4 GHz band is used for the frequency of the high-frequency signal transmitted between the first antenna 106 and the second antenna 109, the distance between those two antennas should be 8 mm or less while the lid part 104 is closed.

While the lid part 104 is closed, the first antenna 106 and the second antenna 109 that are disposed so as to face each other in parallel to each other and aligned at both ends respectively. Unless the elements of the two antennas are in parallel, the transmission loss is increased due to the disagreement between their planes of polarization. And, in case the elements of the two antennas are shifted from each other in the parallel direction, the radiation pattern maximum values of those antennas do not match, thereby transmission loss is also increased.

In case the specific permittivity $\epsilon\gamma$ of the medium existing between the first and second antennas 106 and 109 is 1 or almost 1, the distance between the two antennas is just required to be ⅛ or under with respect to the wavelength $\lambda$ in the air. In case the specific permittivity $\epsilon\gamma$ of the medium existing between the first and second antennas 106 and 109 is larger than 1, however, the wavelength of the electromagnetic wave in the dielectric material becomes $(1/\epsilon\gamma)^{-1/2}$. The distance between the two antennas is thus reduced according to the wavelength. Consequently, in case a material having a large specific permittivity exists in a section between the two antennas, the distance is reduced in that section. The distance between the two antennas can thus be reduced according to the section. And, in case the housings are made of RF absorbable materials or plated with RF reflective materials, those materials on the line of radiational direction should be removed or structured so as not to disturb the antenna radiation, the material should be removed from the radial direction (or incidence direction) of each antenna or structured so as not to disturb the radiation.

Each antenna is configured by a wire or strip metallic material or wire or strip metallic plate. The signal cables 107 and 110 are usually coaxial cables. They may be a balanced two-wire line or a printed wire line.

A proper mode converter may be disposed between the signal cable 107/110 and the antenna 106/109/111 respectively. An impedance matching device, an amplifier, a band filter, or the like may be put at a middle point of each signal cable or between a signal cable and an antenna respectively.

The radio device 108 provides functions for sending and/or receiving a high-frequency signal. For example, the radio device may be a PC card conforming to the PCMCIA (Personal Computer Memory Card International Association) standards, etc. The radio device 108 may be built in the subject lap-top PC.

The flat surface display 105 may be a liquid crystal display, an EL element array, and any of other LED arrays. In case the flat surface display which is an active matrix type one, the second antenna 109 and the third antenna 111 may be constructed on the substrate on which the active matrix circuit is formed.

The frequency band used for transmitting an electrical signal has large amount of information. And, because the antenna size is limited, a GHz band is usually used.

In FIGS. 1 and 2, the lid part 104 of the lap-top PC is opened. While the lid part 104 is opened such a way, the distance between the first antenna 106 and the second antenna 109 is large and the polarization is shifted significantly between the two antennas 106 and 109. Thus, the two antennas are not coupled electrically. Consequently, no electrical signal is transferred (or very little if any) between the two antennas. While the lid part 104 is opened as shown in FIGS. 1 and 2, signals are transmitted (or received) via the first antenna as shown as radiated radio waves 113. In this case, the third antenna 111 and the second antenna 109 do not function.

Figure 3:
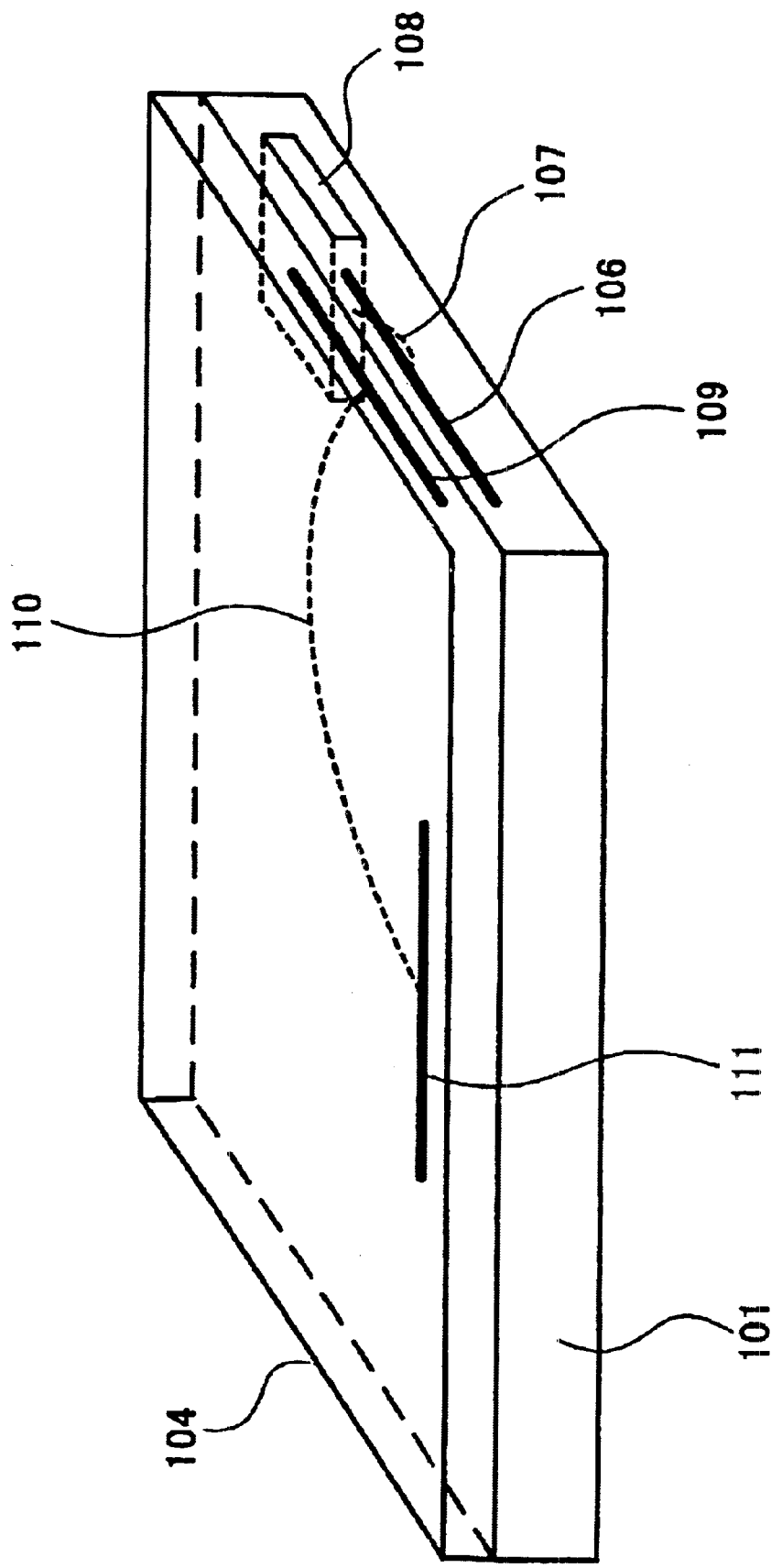
FIG. 3 is a perspective view of the computer system with its lid part closed in the embodiment of the present invention.
Figure 4:
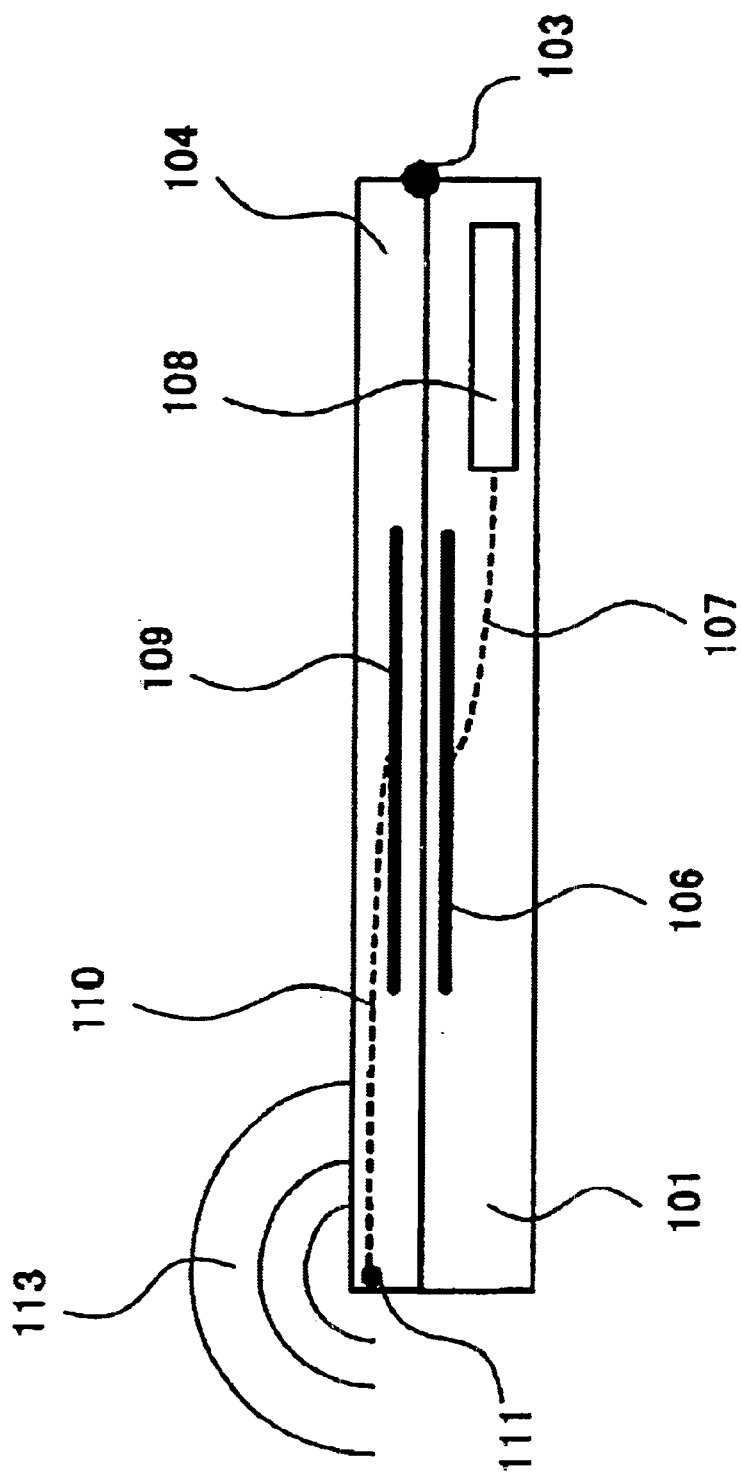
FIG. 4 is a cross sectional view of the computer system with its lid part closed shown in FIG. 3.

On the other hand, FIGS. 3 and 4 shows the lid part 104 that is closed. FIG. 3 is a perspective view of the computer system whose lid part is closed in this embodiment. FIG. 4 is a cross sectional view of the computer system shown in FIG. 3. In FIG. 4, the first antenna 106 and the second antenna 109 are close to each other, thereby the two antennas 106 and 109 are electromagnetically engaged to each other. In this state, a high-frequency signal can be transferred efficiently between the two antennas 106 and 109. The high-frequency signal output from the radio device 108 is transmitted to the first antenna 106 via the signal cable 107. The first antenna 106 is lidded by the lid part 104, so that radio waves are not output from the first antenna 106 so efficiently. (Although some radio waves are output in the horizontal direction depending on the structure of the computer system, the upper direction is shielded by the lid part 4 in which a flat display driving circuit or the like is included, and consequently the output efficiency is not so high.)

However, because the first antenna 106 and the second antenna 109 are electromagnetically engaged to each other, a high-frequency signal is transferred efficiently from the first antenna 106 to the second antenna 109. And, this high-frequency signal is powered by the third antenna 111 via the signal cable 110, then output as the radio wave 113 is radiated outside the lap-top personal computer from the third antenna 111 as shown in FIG. 4.

Figure 5:
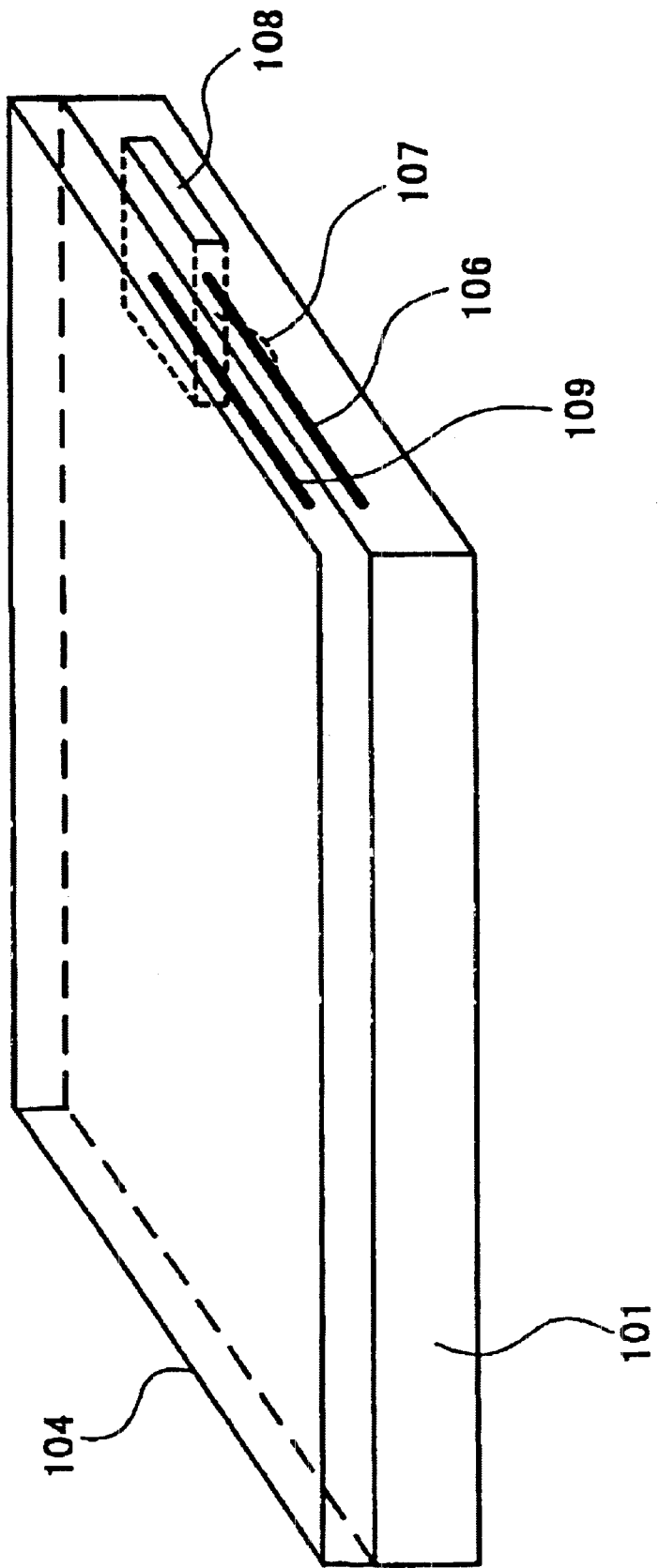
FIG. 5 is a perspective view of another computer system in a first embodiment of the present invention.
Figure 6:
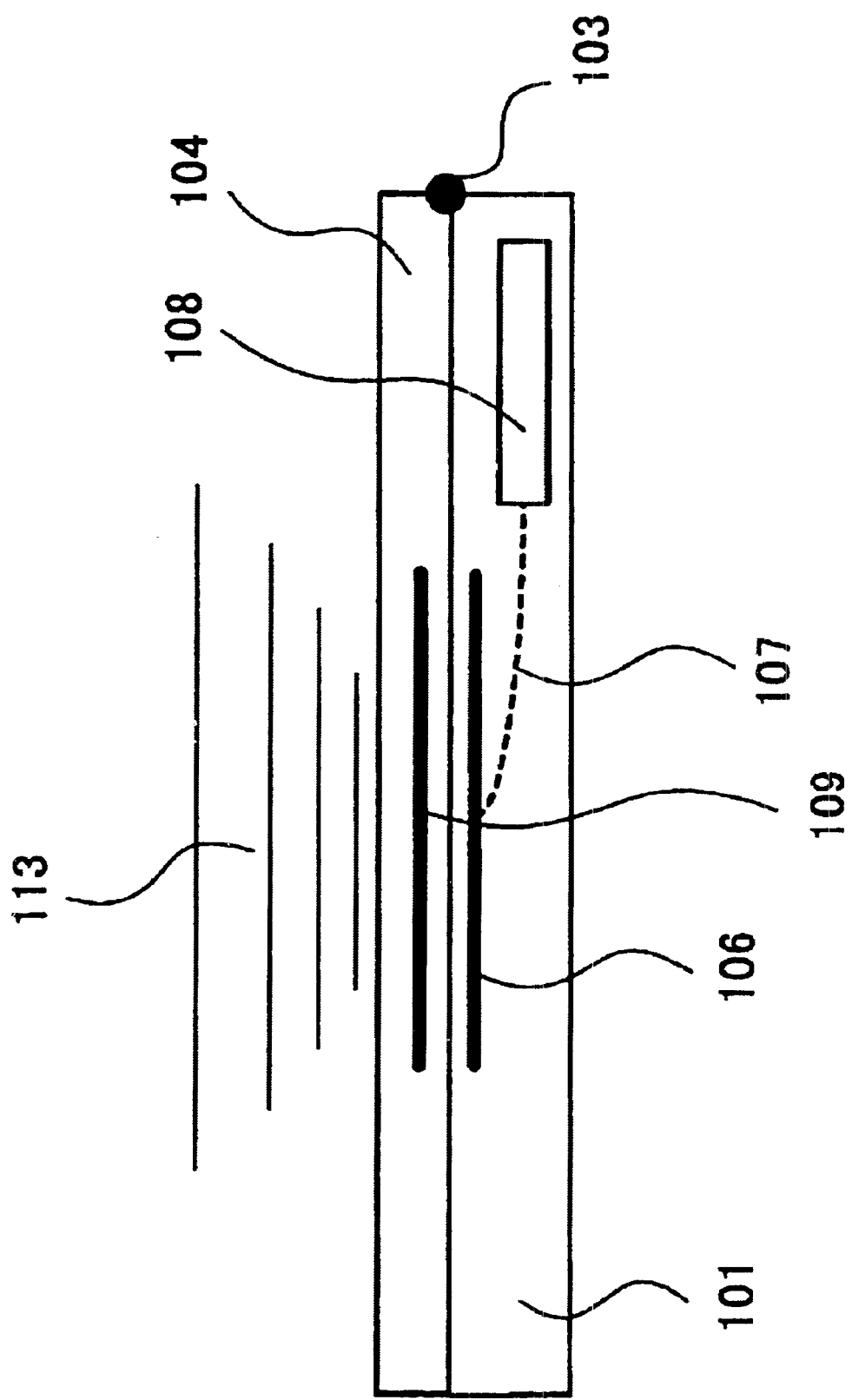
FIG. 6 is a cross sectional view of the computer system shown in FIG. 5.

As shown in FIGS. 3 and 4, signal waves can be radiated such way even when the lid part 104 is closed. This structure enables a high-frequency signal to be transmitted in a non-contact manner at the coupling between the base unit part 101 and the lid part 104. Thus, there is no need to pass a signal cable through the movable joint 103. Consequently, the signal cable 107 is free of damages that have often been caused by repetitive opening and closing of the lid part 104. It is also possible to omit the manufacturing labor involved in passing the signal cable between the base unit part and the lid part. In this embodiment, the computer system of the present invention is provided with a third antenna 111. However, the third antenna 111 may be omissible as shown in FIGS. 5 and 6. FIG. 5 is a perspective view of the computer system in another example of the first embodiment. FIG. 6 is a cross sectional view of the computer system shown in FIG. 5. Concretely, in the example shown in FIGS. 5 and 6, both of the third antenna 111 and the signal cable 110 are removed and only the second antenna 109 is installed. The second antenna 109 has none of cables and other electrical connections. It is a line-like metallic conductor having a length almost equal to the first antenna 106. In this case, while the lid part 104 is opened, the first antenna 106 radiates a high-frequency signal as described above. And, while the lid part 104 is closed, the first antenna 106 transfers a high-frequency signal to the second antenna 109, then the second antenna 109 radiates a high-frequency signal as the radiated radio wave 113. Concretely, the second antenna 109 functions as a radiation element. And, because the second antenna 109 functions as a radiation element such way, a high-frequency signal can be radiated to external efficiently even while the lid part 104 is closed.

In the example described in this embodiment, the lid part 104 is opened and closed so as to change the electromagnetic coupling state between the first antenna 106 attached to the base unit part 101 and the second antenna 109 attached to the lid part 104, thereby disconnecting the electromagnetic coupling of the second antenna 109 of the lid part 104 from the base unit part. Such a structure that changes the electromagnetic coupling state between the two antennas, thereby coupling and discontinuing electromagnetically between the two antennas can also apply other electrical apparatus in addition to this embodiment.

Second Embodiment

Figure 7:
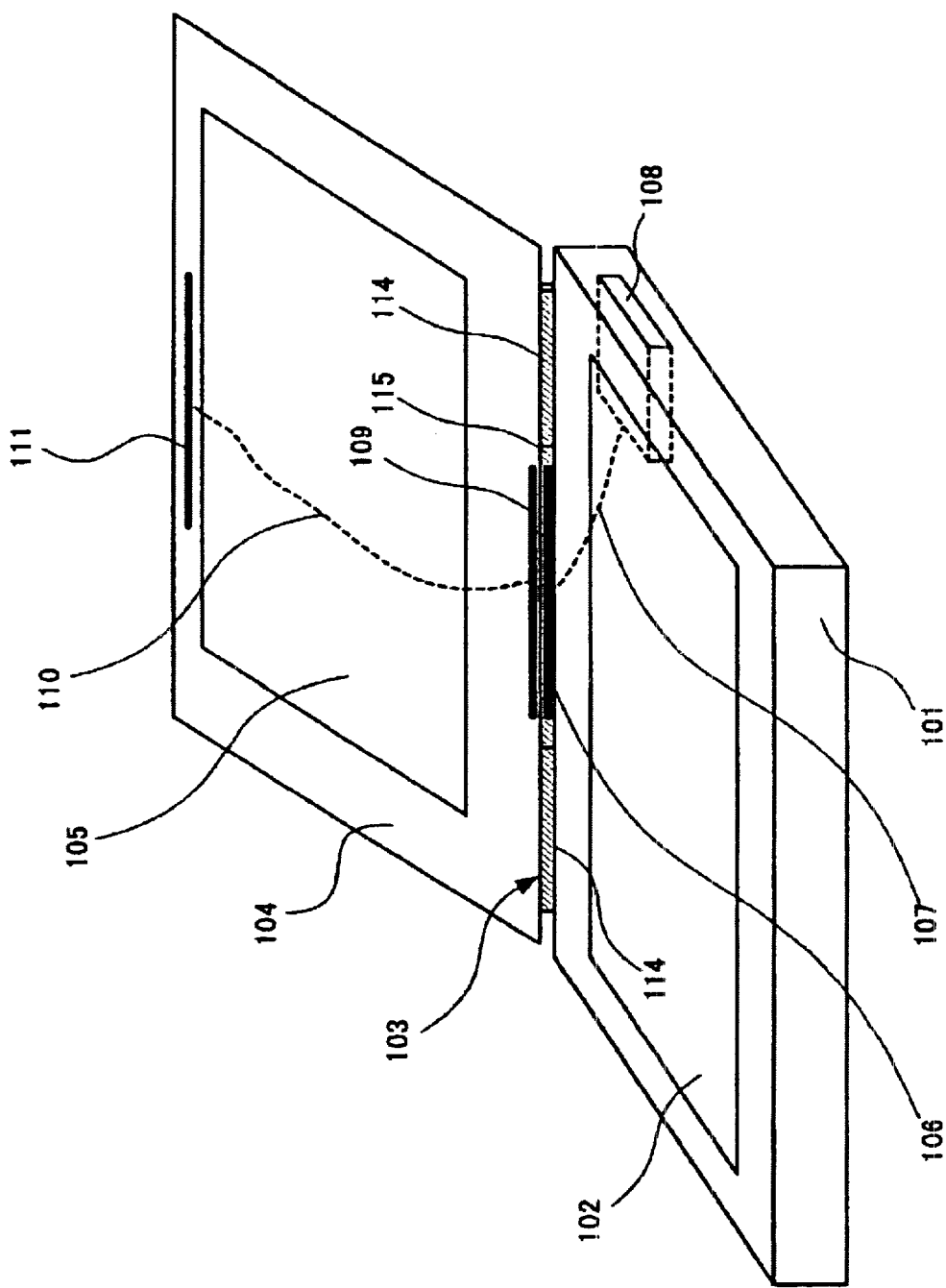
FIG. 7 is a schematic perspective view of the computer system in another embodiment of the present invention.
Figure 8:
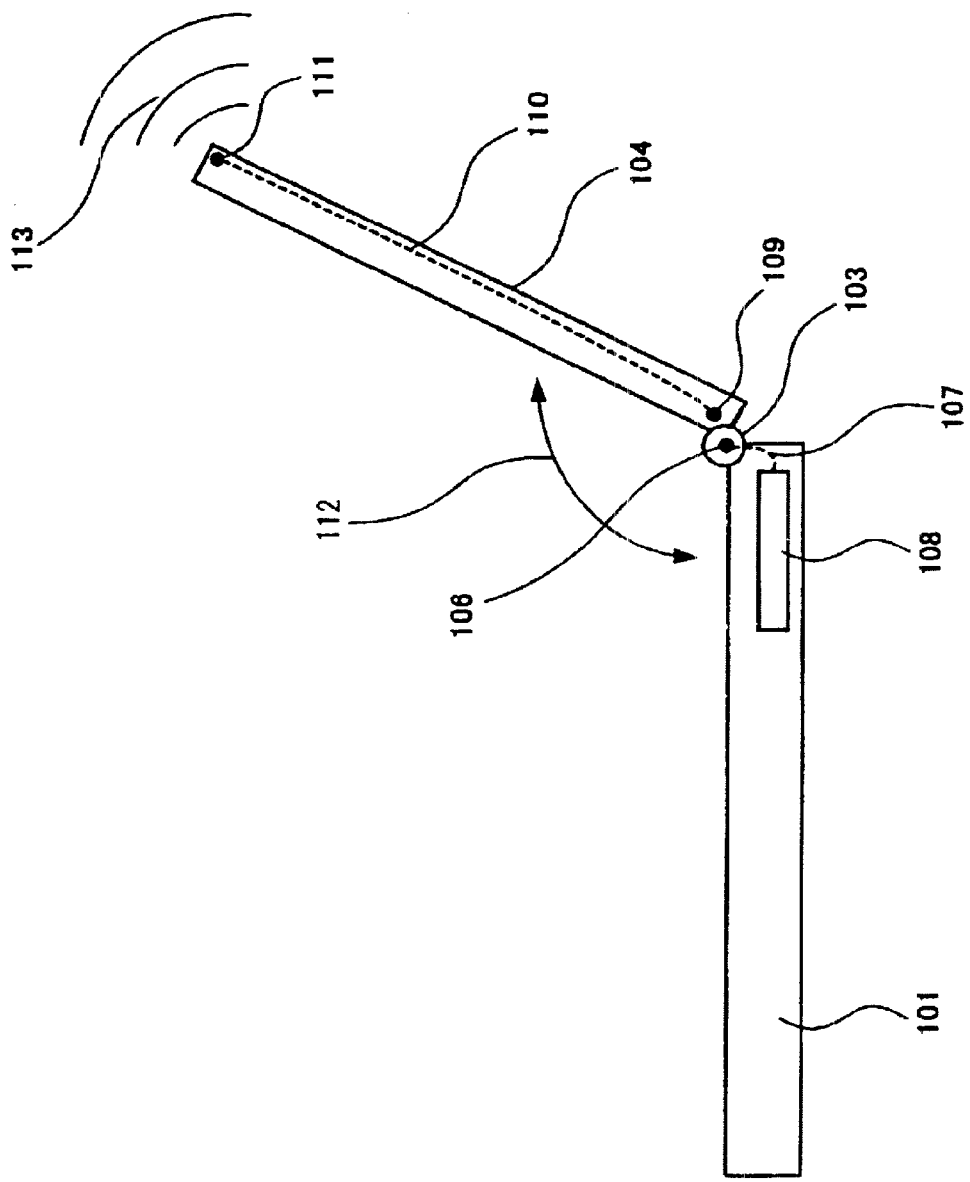
FIG. 8 is a schematic cross sectional view of the computer system shown in FIG. 7.

FIG. 7 is a schematic perspective view of the computer system in a second embodiment of the present invention. FIG. 8 is a cross sectional view of the computer system shown in FIG. 7. The computer system in this second embodiment is a lap-top personal computer as described in the first embodiment.

The computer system enables a high-frequency signal to be transmitted between the base unit part and the lid part whether the lid part is opened or closed. Unless otherwise specially described, the items in this computer system are the same as those in the first embodiment.

The personal computer in this second embodiment employs a structure configured by members 114 and 115 used as the joint 103 between the base unit part 101 and the lid part 104.

The member 114 is actually divided into two and fixed to the lid part 104. Each member 114 has a hollow portion. The member 115 has shafts (not illustrated) disposed at both ends thereof. The member 15 is fixed to the base unit part 101 and disposed between the two-divided members 114. The two shafts (not illustrated) of the member 115 are housed in the hollow portions of the members 114. The two shafts of the member 115 are rotational in the hollow portions of the members 114. When the lid part 104 is opened/closed, the two members 114 are rotated radially around each of the shafts disposed at both ends of the member 115.

In this second embodiment, the first antenna 106 is disposed in the member 115. The first antenna 106 is disposed on the same axis or almost on the same axis as the center of the rotation made by the opening/closing of the lid part 104 (see FIG. 8). And, the second antenna 109 is disposed at a position facing the first antenna 106 in the lower end of the lid part 104. The positional relationship between the first antenna 106 and the second antenna 109 is the same as that in the first embodiment while the lid part 104 is closed. Concretely, the two antennas 106 and 109 are disposed in parallel to each other and aligned at both ends of them respectively. The distance between the two antennas 106 and 109 is $(\lambda/8)(\epsilon\gamma)^{-1/2}$ or under when the specific permittivity of the dielectric material existing therebetween is $\epsilon\gamma$.

In the second embodiment shown in FIGS. 7 and 8, the relative positional relationship between the first antenna 106 and the second (auxiliary) antenna 109 remains the same whether the lid part 104 is opened or closed. This is because the first antenna 106 is disposed in the center of the rotation done when the lid part 104 is opened/closed and the positional relationship between those antennas 106 and 109 is not changed by the opening/closing of the lid part 104. On the other hand, the second antenna 109 just moves on the circumference of the concentric circle formed around the first antenna 106 when the lid part 104 is opened/closed.

Consequently, in the case of the structure shown in FIGS. 7 and 8, the relative positional relationship between the two antennas remains the same whether the lid part 104 is opened or closed. Thus, no change occurs in the transmission state of the high-frequency signal between the first antenna 106 and the second antenna 109. For example, the high-frequency signal output from the radio device 108 is transmitted to the first antenna 106 via the signal cable 107, then transmitted to the second antenna 109 disposed closely to the first antenna 106. The high-frequency signal transmitted to the second antenna 109 is transmitted to the third antenna 111 via the signal cable 110, then radiated outside the computer therefrom.

For this embodiment, the level of the high-frequency signal received by the third antenna 111 is fixed whether the lid part 104 is opened or closed. This is because the signal transmission from the first antenna 106 to the second antenna 109 is kept in the same state whether the lid part 104 is opened or closed as described above. Although a description has been made for transmission of a signal in the above embodiment, the same effect can also be obtained in receiving of the signal.

As described above, the high-frequency signal can be transmitted in a non-contact manner between the base unit part 101 and the lid part 104 whether the lid part 104 is opened or closed when the structure shown in this embodiment is employed. Consequently, it is possible to avoid the problems to occur when a signal cable is used for the connection between the base unit part and the lid part. The transmission mechanism from the first antenna to the second antenna shown in this embodiment can thus be employed for such structures as lids, doors, etc.

Third Embodiment

Figure 9:
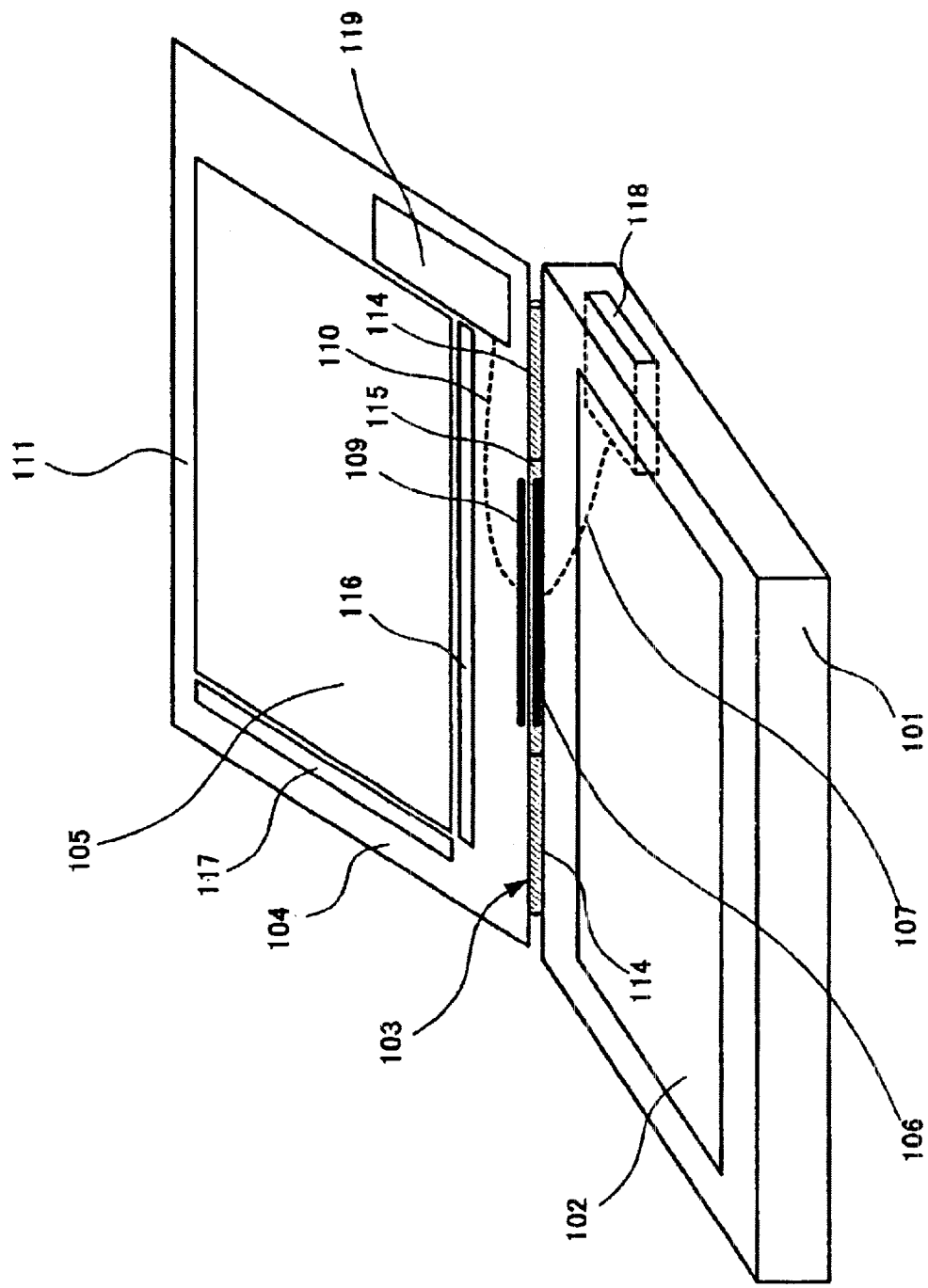
FIG. 9 is a schematic perspective view of the computer system in still another embodiment of the present invention.
Figure 10:
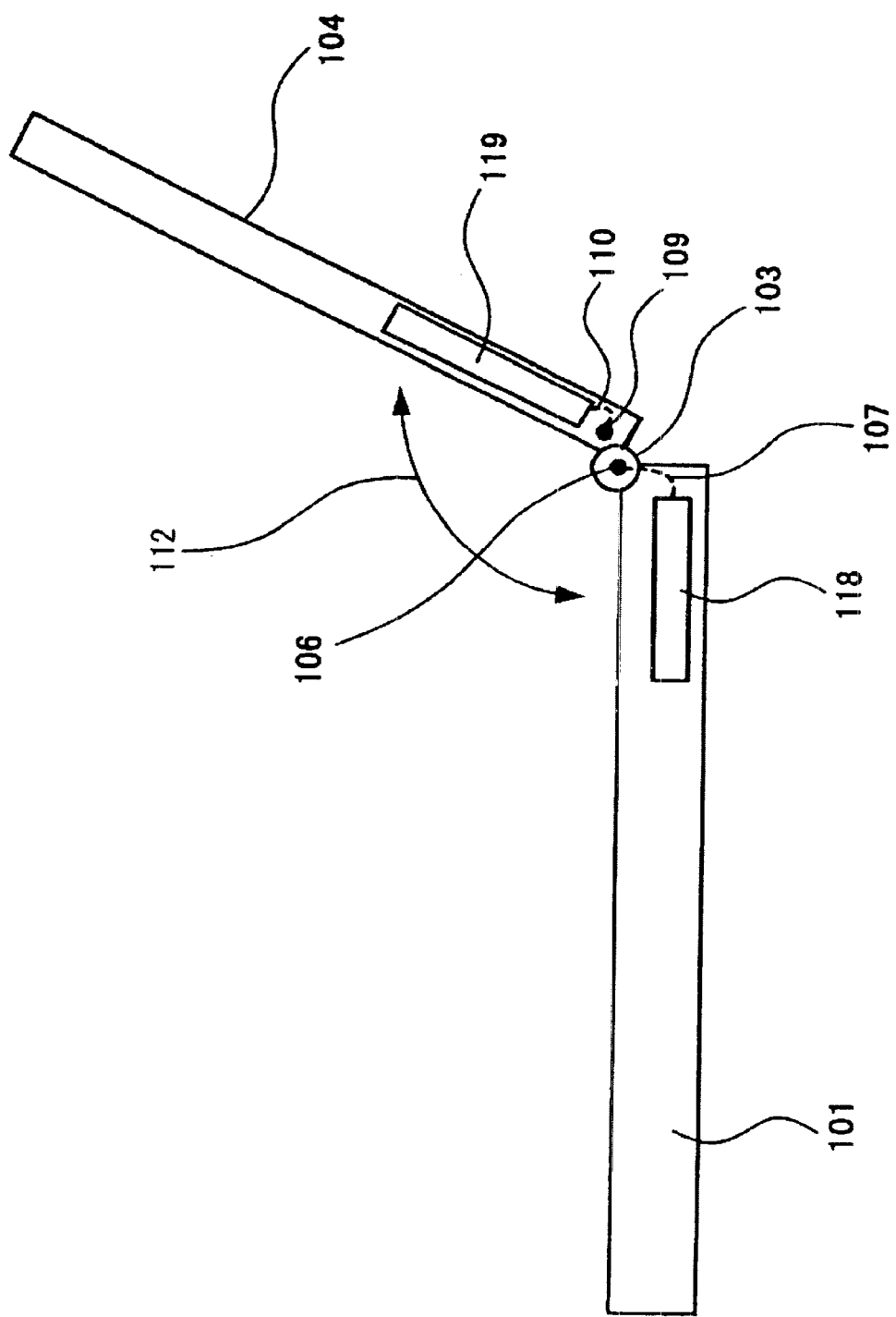
FIG. 10 is a schematic cross sectional view of the computer system shown in FIG. 9.

FIG. 9 is a schematic perspective view of the computer system in a third embodiment of the present invention. FIG. 10 is a schematic cross sectional view of the computer system shown in FIG. 9. The computer system in this third embodiment employs a non-contact transmission method that transmits a drive signal (image signal) of the flat surface display provided at the lid part from the base unit part. In this third embodiment, an image signal output from an image signal generator 118 disposed in the base unit part 101 is transmitted to the first antenna 106 via the signal cable 107.

The first antenna 106 is a $(\frac{1}{2})\lambda$ dipole antenna. As described in the second embodiment, the first antenna 106 is disposed in the center of the shaft of the joint 103, which is a connection part between the base unit part 101 and the lid part 104. The second antenna 109 is disposed at the lower end of the lid part 104, closely to the first antenna 106. The second antenna 109 is also a $(\frac{1}{2})\lambda$ dipole antenna. The positional relationship between the first antenna 106 and the second antenna 109, as well as the disposition of those antennas 106 and 109 are the same as those described in the second embodiment. Concretely, the state of the connection between the first antenna 106 and the second antenna 109 is fixed even in the structure shown in FIGS. 9 and 10 whether the lid part 104 is opened or closed.

More concretely, the transmission state of the high-frequency signal is fixed between the first antenna 106 and the second antenna 109 whether the lid part 104 is opened or closed.

The image signal generator 118 generates a high-frequency signal corresponding to the image information displayed on the flat-surface display according to the signal processed by the mother board (not illustrated) disposed inside the base unit part 101. The image signal generator 118 generates a high-frequency signal (the high-frequency signal transmitted from the first antenna 106 to the second antenna 109 in this case) including image information to be displayed. The high-frequency signal including this image information is transmitted to the first antenna 106 via the signal cable 107.

As described above, the first antenna 106 and the second antenna 109 are electromagnetically engaged to each other in a non-contact manner. Consequently, the high-frequency signal including image signal by the image signal generator is transmitted from the first antenna 106 to the second antenna 109. The signal is then entered to the image signal processor 119 via the signal cable 110.

The image signal processor 119 generates an image information signal according to the high-frequency signal received from the image signal generator 118. And, according to this image information signal, the peripheral drivers 116 and 117 are driven so as to display necessary image information on the flat-surface display 105.

The flat-surface screen may be a liquid crystal display or any other display device that employs light emission elements. In case the flat-surface display is provided with a function for accepting information entered by a touch pen, etc., necessary information is sent to the base unit part 101 by following the path described above backward. In this case, the lid part 104 is required to have a circuit (not illustrated) for processing entered information.

Furthermore, in this third embodiment, the computer system is not provided with any communication antenna described in the first and second embodiments. However, the computer system in this third embodiment may be provided with such a communication antenna, necessary circuits, etc. as described in the first and second embodiments. This third embodiment may also apply to any portable information processing terminals other than the lap-top personal computer described above, of course.

Fourth Embodiment

Figure 11:
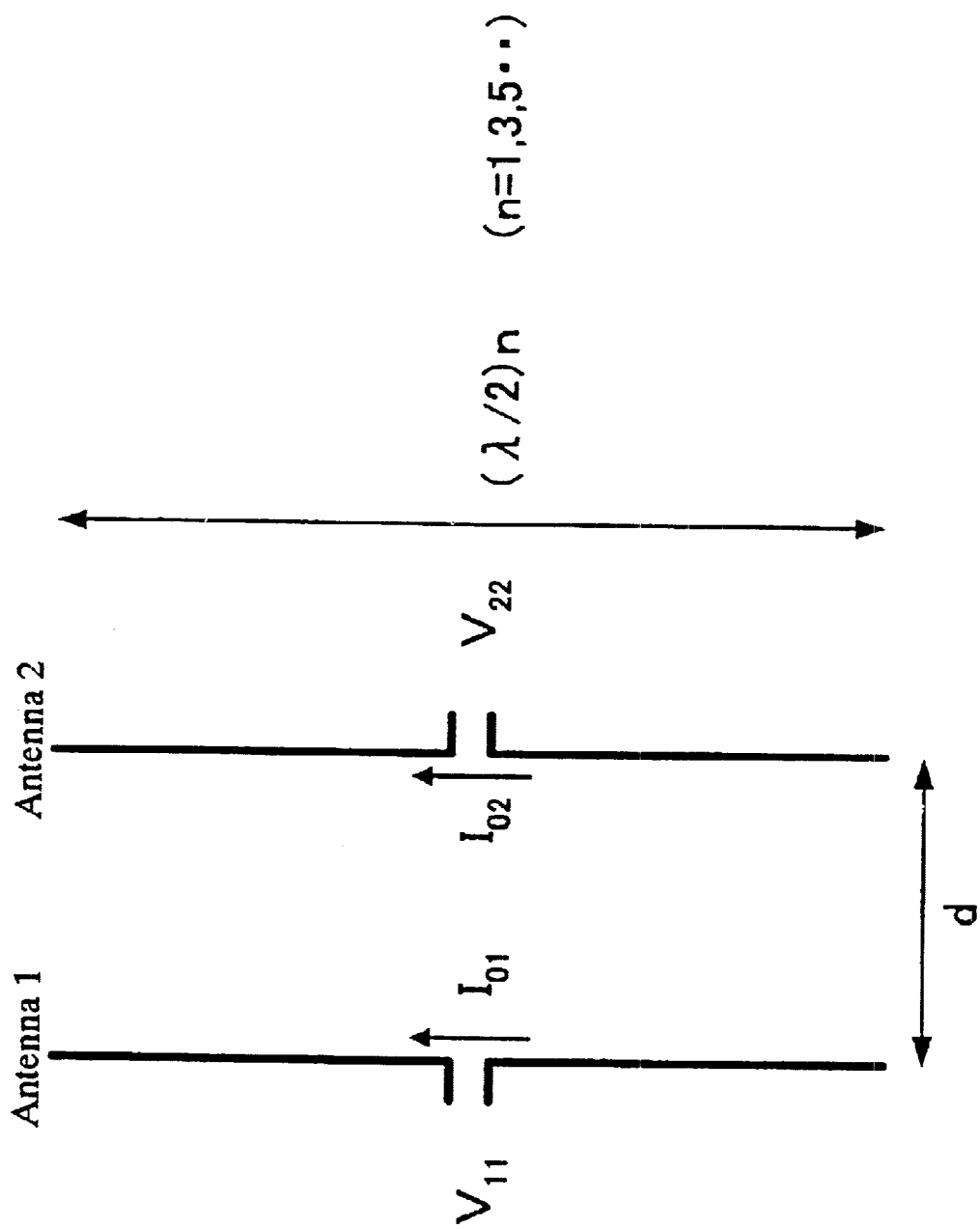
FIG. 11 illustrates a relationship between a structure and a position of an antenna in an embodiment of the present invention.

In this fourth embodiment, an antenna employable for the present invention will be described. FIG. 11 shows a structure of such an antenna and a positional relationship with another antenna in this embodiment of the present invention. Concretely, a description will be made for a pair of dipole antennas disposed so as to face each other at a distance of d therebetween as shown in FIG. 11. This pair of antennas are disposed in parallel to each other and aligned at both ends of them respectively. The length of the antenna element is $(\lambda/2)n$ respectively. The n is an integer like 1, 2, 3, .... Usually, n=1 is employed.

Figure 12:
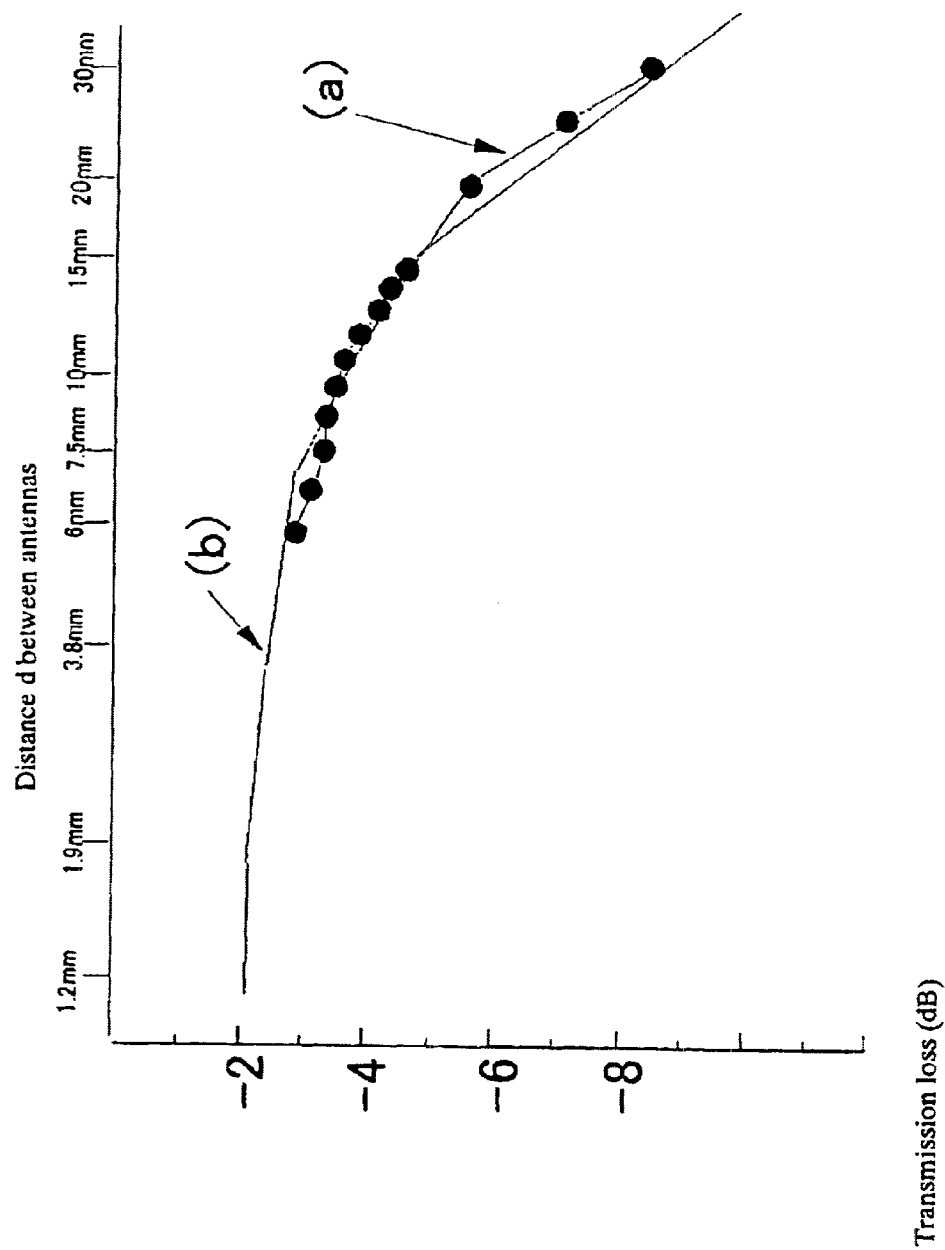
FIG. 12 is a graph denoting a transmission efficiency of a high-frequency electric power transmitted from antenna 1 to antenna 2 at n=1, a curve (a) in a graph denoting measured data and a curve (b) denoting a result of simulation done under a condition that enables a graph data to be obtained.

FIG. 12 is a graph denoting the transmission efficiency of the high-frequency electric power transmitted from the antenna 1 to the antenna 2 at n=1. The curve (a) denotes measured data and the curve (b) denotes a result of simulation done with the Moment Method according to the condition under which graph data is obtained. The data shown in FIG. 12(a) is obtained when a 3 mm-diameter brass round rod is used as an antenna element and the frequency of the transmission signal is set to 2.45 GHz.

FIG. 12(a) suggests that a high-frequency electric power can be transferred from the antenna 1 to the antenna 2 when the two antennas 1 and 2 are disposed closely to each other. In this case, a few decibels (dB) of transmission loss is permitted. Of course, the same effect is obtained when the high-frequency electric power is transmitted from the antenna 2 to the antenna 1. FIG. 12(b) shows apparently that the measured data matches at a high accuracy with the simulation result obtained by the Moment Method. And, the curves (a) and (b) in FIG. 12 suggest that the closer antennas 1 and 2 are disposed to each other, the more efficiently the high-frequency electric power can be transmitted.

Figure 13:
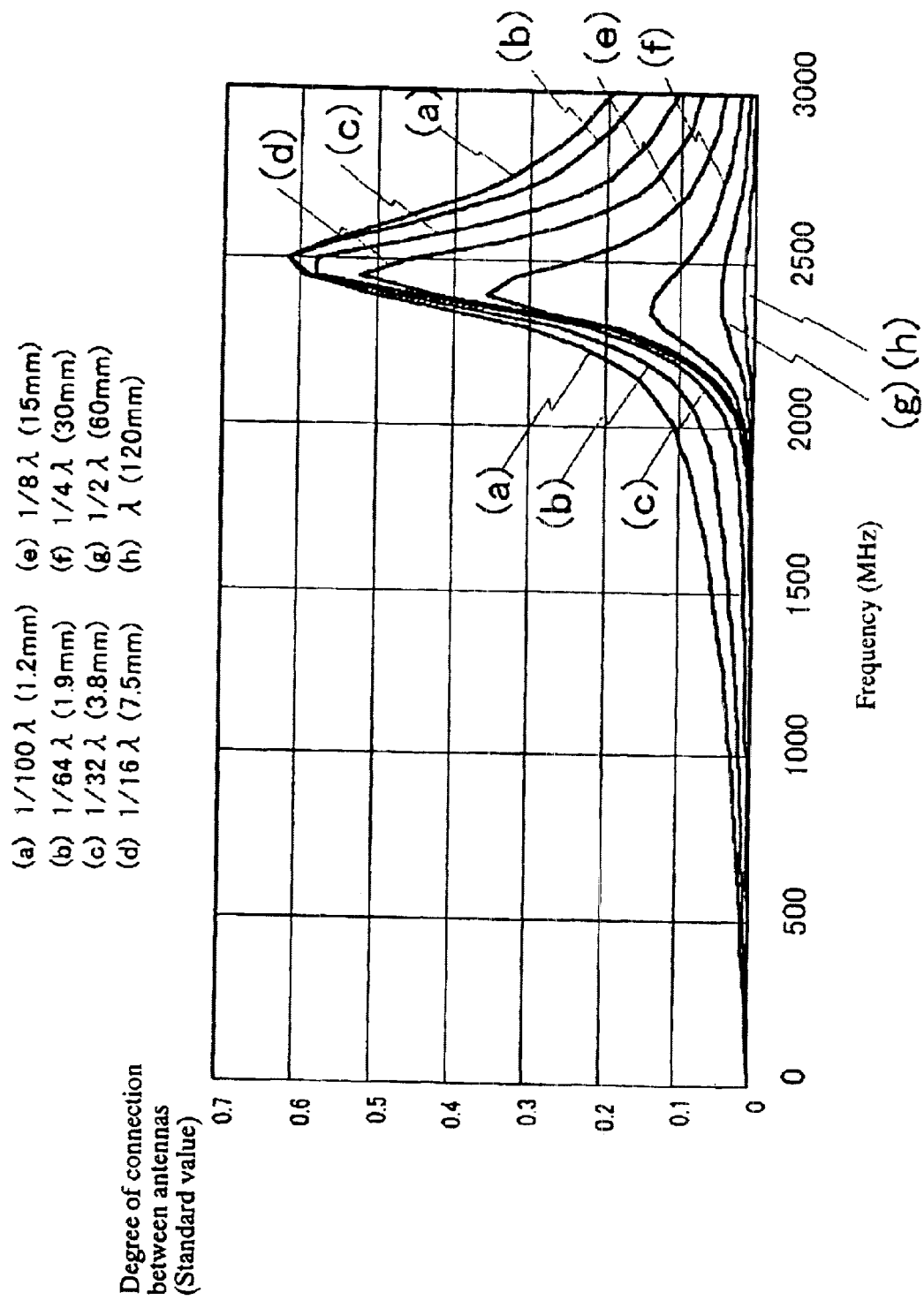
FIG. 13 is a graph denoting a state check result of a connection between the two antennas with respect to frequencies under the condition that enables the graph data shown in FIG. 12 to be obtained.

On the other hand, FIG. 13 shows a graph denoting a check result of the connection between the two antennas on the condition under which the subject data shown in FIG. 12 is obtained with respect to frequencies. This graph denotes that the connection between the two antennas is improved when the distance between those antennas is narrowed. What is shown in FIG. 12 is how much of the high-frequency energy radiated from the antenna 1 is lost while energy is received by the antenna 2; rather than showing how much of the high-frequency electric power supplied to the antenna 1 is received by the antenna 2. In order to obtain such the data, the mutual impedance between the two antennas must be taken into consideration. The mutual impedance is also changed between the two antennas shown in FIG. 11 due to the difference of the distance d between the two antennas. Hereinafter, the relationship between the distance d and the mutual impedance will be described.

In case the relationship between the voltage $V_{22}$ and the current $I_{02}$ at the input terminal of the antenna 2 are assumed as a four-terminal circuit network while the two antennas are disposed as shown in FIG. 11, the relationship between the voltage $V_{11}$ and the current $I_{01}$ at the input terminal of the antenna 1, they ($V_{22}$ and $I_{02}$) can be represented as follows in (Equation 1).

$$\begin{bmatrix} V_{11} \\ V_{12} \end{bmatrix} = \begin{bmatrix} Z_{11} & Z_{12} \\ Z_{21} & Z_{22} \end{bmatrix} \begin{bmatrix} I_{01} \\ I_{02} \end{bmatrix} \quad \text{Equation 1}$$

Here, $Z_{11}$ denotes the self-impedance of the antenna 1 and $Z_{22}$ denotes the self-impedance of the antenna 2. In case the two antennas are dipole antennas having a thin half wavelength respectively, both of the self-impedance values are equal, that is, $Z_{11}=Z_{22}=73.1+j42.5$ ($\Omega$) is satisfied. $Z_{12}$ denotes a mutual impedance transmitted from the antenna 1 to the antenna 2. $Z_{21}$ denotes a mutual impedance transmitted from the antenna 2 to the antenna 1. $Z_{21}=Z_{12}$ is thus satisfied by the principle of reciprocity.

In case it is assumed that the distance between antennas is d(m) and the length of each antenna is L(m) (an odd multiple), each of $Z_{12}$, $R_{12}$, and $X_{12}$ can be represented as follows in (Equation 2), (Equation 3), and (Equation 4). In Equations 2 to 4, the unit is "$\Omega$".

$$Z_{12}=Z_{21}=R_{12}+jX_{12}=R_{21}+jX_{21} \quad \text{Equation 2}$$

$$R_{12}=30\{2\times C(\beta d)-C[\beta(\sqrt{d^2+L^2}+L)]-C[\beta(\sqrt{d^2+L^2}-L)]\} \quad \text{Equation 3}$$

$$X_{12}=-30\{2\times S(\beta d)-S[\beta(\sqrt{d^2+L^2}+L)]-S[\beta(\sqrt{d^2+L^2}-L)]\} \quad \text{Equation 4}$$

In the above Equations, b denotes a propagation constant in a free distance and it is given as b=2p/l (l: a wavelength). C denotes a cosine integral and S denotes a sine integral.

(Equation 1) represents the electromotive force/current properties between antennas 1 and 2 as an impedance matrix. In order to examine the transmission rate of the high-frequency electric power from the antenna 1 to the antenna 2, however, (Equation 1) should be represented by an S parameter for easier handling. In case, the impedance matrix in (Equation 1) is normalized by a normalization impedance 50($\Omega$) and converted to an [S] matrix, therefore, the following (Equation 5) is obtained.

$$[S] = \begin{bmatrix} S_{11} & S_{12} \\ S_{21} & S_{22} \end{bmatrix} = \left( \begin{bmatrix} \frac{Z_{11}}{50} & \frac{Z_{12}}{50} \\ \frac{Z_{21}}{50} & \frac{Z_{22}}{50} \end{bmatrix} + \begin{bmatrix} 1 & 0 \\ 0 & 1 \end{bmatrix} \right)^{-1} \cdot \quad \text{Equation 5}$$

$$\left( \begin{bmatrix} \frac{Z_{11}}{50} & \frac{Z_{12}}{50} \\ \frac{Z_{21}}{50} & \frac{Z_{22}}{50} \end{bmatrix} - \begin{bmatrix} 1 & 0 \\ 0 & 1 \end{bmatrix} \right)$$

The transmission rate of the high-frequency electric power from the antenna 1 to the antenna 2 can be represented by $(S_{12}.S_{12}*)$. Here, the absolute value $|(S_{12}.S_{12}*)|$ of $(S_{12}.S_{12}*)$ represents a ratio of the electric power transmitted from the antenna 1 to the antenna 2 when the antenna 2 is terminated at a normalized impedance. $S_{12}=S_{21}$ is also satisfied here by the principle of reciprocity.

Figure 14:
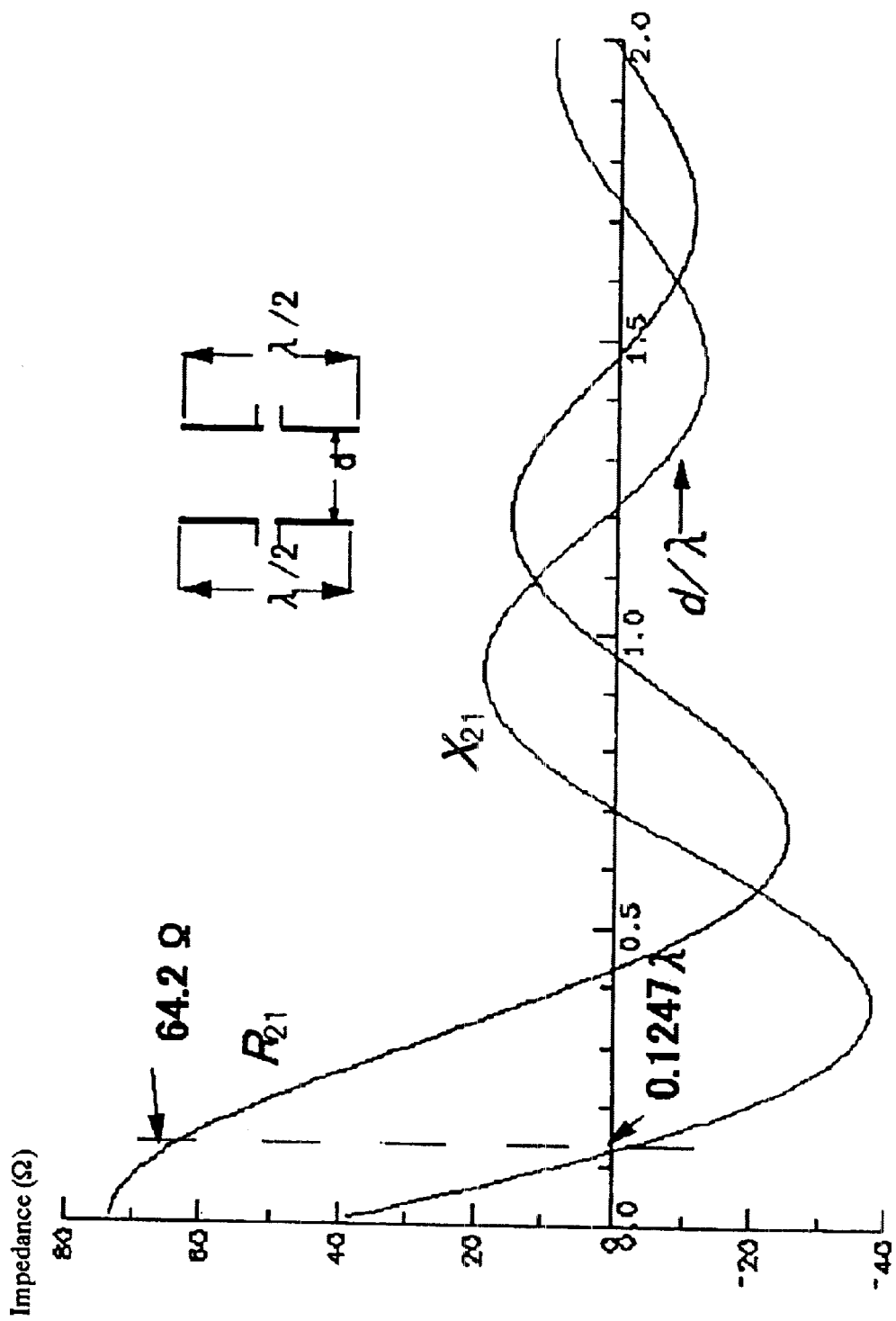
FIG. 14 is a graph denoting a mutual impedance value as a function of the distance normalized by a wavelength $\lambda$.

FIG. 14 shows a calculation result of the mutual impedance $Z_{12}$ between antennas 1 and 2 from (Equation 3) and (Equation 4) in the state shown in FIG. 11. FIG. 14 is a graph denoting a mutual impedance value as a function of the distance normalized by a wavelength $\lambda$. The graph shown in FIG. 14 is divided into a real part and an imaginary part.

When the case as depicted in FIG. 11 is assumed for a transmission system, high-frequency electric power is transmitted most efficiently from the antenna 1 to the antenna 2 when the mutual impedance $Z_{12}$ becomes pure resistance, that is, when the imaginary part (reactance) becomes 0. FIG.

14 therefore suggests that such a high transmission rate is obtained when d=about 0.125λ, d=about 0.7λ, d=about 1.2λ . . . are satisfied. However, as shown in FIGS. 12 and 13 clearly, the distance d between antennas 1 and 2 should be narrowed more, preferably 0.125λ or under. Otherwise, the transmission loss from the antenna 1 to the antenna 2 is increased. It is thus concluded as follows; the antennas 1 and 2 should be disposed at a distance of about 0.125λ or thereabouts/therebetween so as to keep such a high rate of transmission from the antenna 1 to the antenna 2.

In case a microwave band is used, there will appear a point where the mutual impedance reaches pure resistance when the distance between antennas is narrowed to about 0.125λ or under. This is because the antenna element diameter is deeply related to a wavelength in such a microwave band. Concretely, in case an antenna element diameter is regarded to be as small as limitlessly, the mutual impedance becomes pure resistance while about 0.125λ is assumed as the distance between the antennas 1 and 2. FIG. 14 shows such a case.

Figure 19:
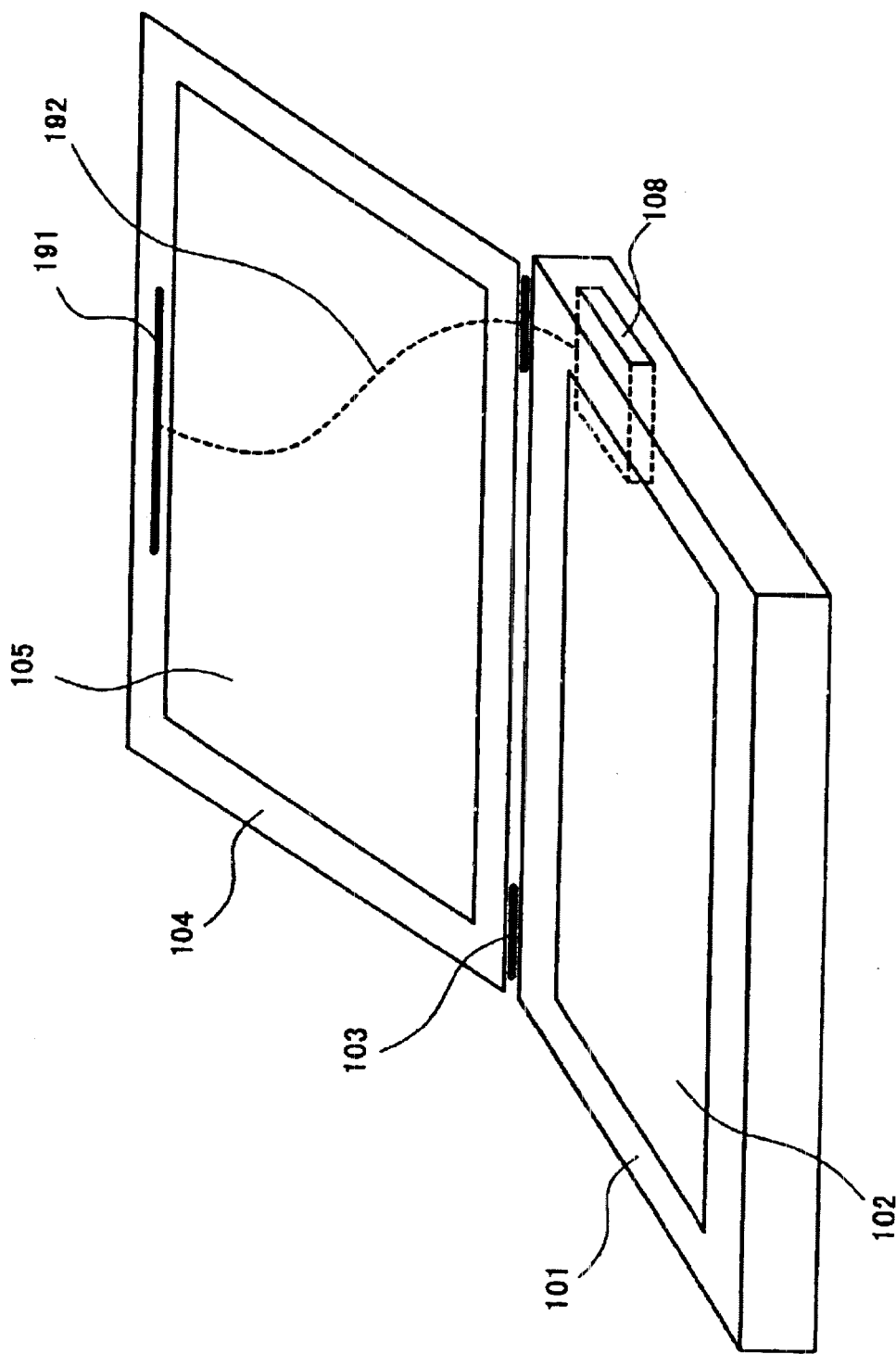
FIG. 19 is a schematic view of a structure of a lap-top personal computer.

Usually, however, an antenna element diameter is not small limitlessly in diameter. Especially, the antenna element diameter becomes larger in a microwave band with respect to a wavelength. Table 1 shows the relationship between antenna element diameter and distance d between antennas when the mutual impedance becomes pure resistance. Concretely, Table 1 shows how the value d is changed according to changes of the antenna diameter when the mutual impedance between antennas 1 and 2 becomes pure resistance. (This data is found in FIG. 19.2, Transmission Lines, Antenna and Waveguides: R. W Kings, and others, McMagrow Hill).

| Wavelength/Antenna element diameter | Distance d between antennas |
|---|---|
| ∞ | 0.125λ |
| $8 \times 10^4$ | 0.093λ |
| $8 \times 10^3$ | 0.086λ |
| $6 \times 10^2$ | 0.077λ |

The following is depicted in Table 1 above. In case the antenna element diameter is small limitlessly and the distance d between the antennas 1 and 2 is 0.125λ (λ/8) while the antennas are disposed as shown in FIG. 11, the mutual impedance between the antennas 1 and 2 becomes pure resistance. Where the antenna element diameter becomes about 1/80,000 with respect to the wavelength λ, however, the mutual impedance between the antennas 1 and 2 becomes pure resistance when the distance between the two antennas becomes about 0.093λ. And, in case the antenna element diameter becomes about 1/8,000 with respect to the wavelength λ, the mutual impedance between the antennas 1 and 2 becomes pure resistance when the distance between the two antennas becomes about 0.086λ.

And, in case the antenna element diameter becomes about 1/600 with respect to the wavelength λ, the mutual impedance between the antennas 1 and 2 becomes pure resistance when the distance between the two antennas becomes about 0.077λ.

Because the antenna element diameter is 3 mm with respect to a wavelength of 112.5 mm (2.45 GHz) when the antennas obtain the data of the curve (a) shown in FIG. 12, the ratio of the diameter to the wavelength becomes about 1/38. Consequently, it is estimated to be d=0.06 to 0.07λ that the mutual impedance between the two antennas reaches pure resistance. Consequently, in case the antennas 1 and 2 are half-wavelength dipole antennas as shown in FIG. 11 and the specific permittivity of the medium between the antennas is about 1, and the transmission frequency is 2.45 GHz, then the mutual impedance can reach pure resistance and the maximum transmission rate can be obtained when the distance d between the two antennas is set to 0.06 to 0.07λ. In this case, because the mutual impedance, to be understood from FIG. 13, becomes about 64Ω, it is easy to adjust the mutual impedance to a 50Ω or 75Ω coaxial cable and it is therefore favorable for practical use.

In case the specific permittivity εγ of the medium between the antennas is large, the adjustment can be done only by narrowing the distance between the antennas to $(1/\epsilon\gamma)^{-1/2}$. When in a practical use, a mode transformer used for imbalance-balance transforming may be disposed between the signal cable and each antenna. The mode transformer may be such a tuning type one for bazooka matching, etc., as well as any of mode transformers that employ a transformer and a taper line.

As described in this embodiment, to transmit the high-frequency signal (or high-frequency energy) of the present invention, a pair of λ/2 dipole antennas must be disposed closely to each other at a distance of λ/8 or under therebetween. In the above description, the distance is set to a value at which the mutual impedance reaches pure resistance so as to obtain the maximum transmission efficiency. However, such the impedance matching may be done with use of an additional matching circuit. For example, in case the antennas cannot be disposed at a required distance therebetween where the mutual impedance reaches pure resistance due to the structural limitation of the installation place, such a matching circuit may be disposed at a power supply point so as to prevent the transmission efficiency from being lowered. Even in this case, the distance between the antennas should be set to 0.125λ (λ/8) or under.

Fifth Embodiment

Figure 15:
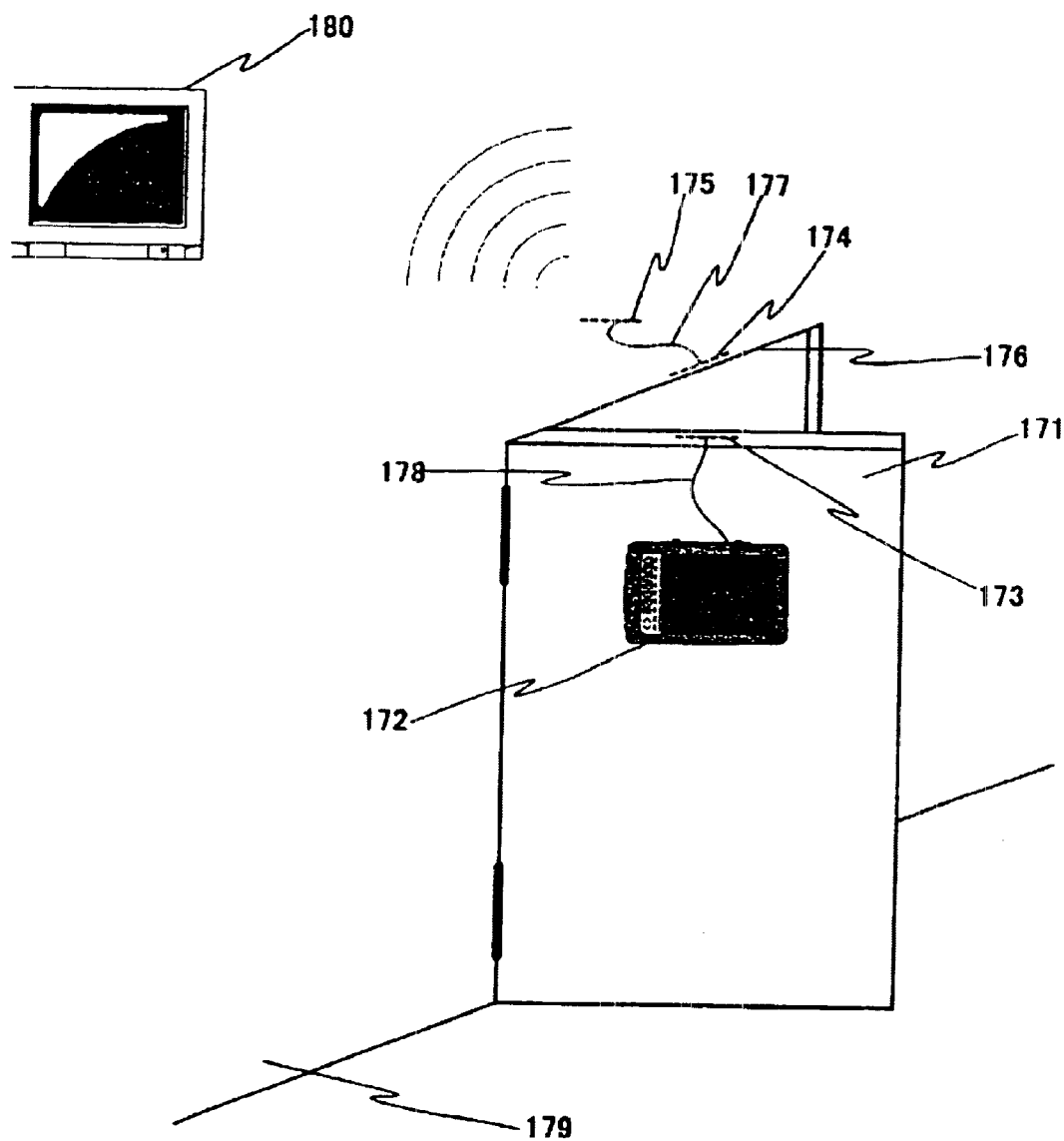
FIG. 15 is an opening/closing structure in an embodiment of the present invention.

In this fifth embodiment, the present invention applies to a house/office door. FIG. 15 shows a door 171 installed at a wall 179. Outside the door 171 is attached an information processing terminal 172. This information processing terminal 172, although not illustrated in detail, is provided with a microphone, a speaker, a display, a keyboard, and a touch panel information input device.

A signal cable 178 is coupled to the information processing terminal 172. And, a first antenna 173 is coupled to the signal cable 178. The first antenna is a λ/2 dipole antenna. The other antenna to be described later is also a λ/2 dipole antenna. The first antenna is attached to the door 171 around its upper side. A second antenna 174 is disposed at the door frame 176 so as to face this first antenna. The distance of the second antenna 174 from the first antenna 173 is reduced up to λ/8 or under when the door 171 is closed.

The antenna 174 is coupled to a third antenna 175 via a signal cable 177. The third antenna 175 is disposed at a wall or on the ceiling of a room, for example, inside or around a door so as to make the antenna radiation into the room more efficient. A monitor 180 for displaying information received from the information processing terminal 172 is disposed in the room. The monitor is provided with a function for outputting voices output from the microphone of the information processing terminal 172 as voices and a microphone for outputting voices from the information processing terminal. The monitor may not be dedicated one; it may be a personal computer.

This system is provided with functions for talking with a visitor who is standing outside the door, leaving a message and/or a guidance to a visitor who calls on the user during his/her absence, recording the visitor, suspicious persons, etc. While the door 171 is closed, the information from the information processing terminal 172 is transmitted to the first antenna 173 via the signal cable 178, then transmitted to the second antenna 174 disposed closely to the first antenna 173. The information output from the second antenna 174 is transmitted to the third antenna 175 via the signal cable 177, then the high-frequency signal is radiated in the room therefrom. The high-frequency signal radiated into the room is then received by the monitor 180 and necessary information is displayed on the monitor 180. On the contrary, to display necessary information on the screen of the information processing terminal 172 from the monitor in the room, the high-frequency signal is transmitted backward through the same path.

In this embodiment, the high-frequency signal is transferred between the first antenna 173 and the second antenna 174 while the door 171 is closed. When the door 171 is opened, however, the distance between the first antenna 173 and the second antenna 174 is increased. And, the more the door 171 is opened wide, the more the shift between the planes of polarization of the two antennas is increased. The transmission efficiency between the first antenna 173 and the second antenna 174 is thus lowered extremely, thereby the transmission path is disengaged.

The system in this embodiment can be attached easily to any existing door.

Therefore, the system in this embodiment has such an advantage that no special construction is need.

Sixth Embodiment

In this sixth embodiment, a pair of antennas are disposed on a coaxial structure/relationship and the cylindrical members on which the two antennas are disposed are rotated relative to each other around the axis so as to change the connection state between the two antennas.

Figure 16:
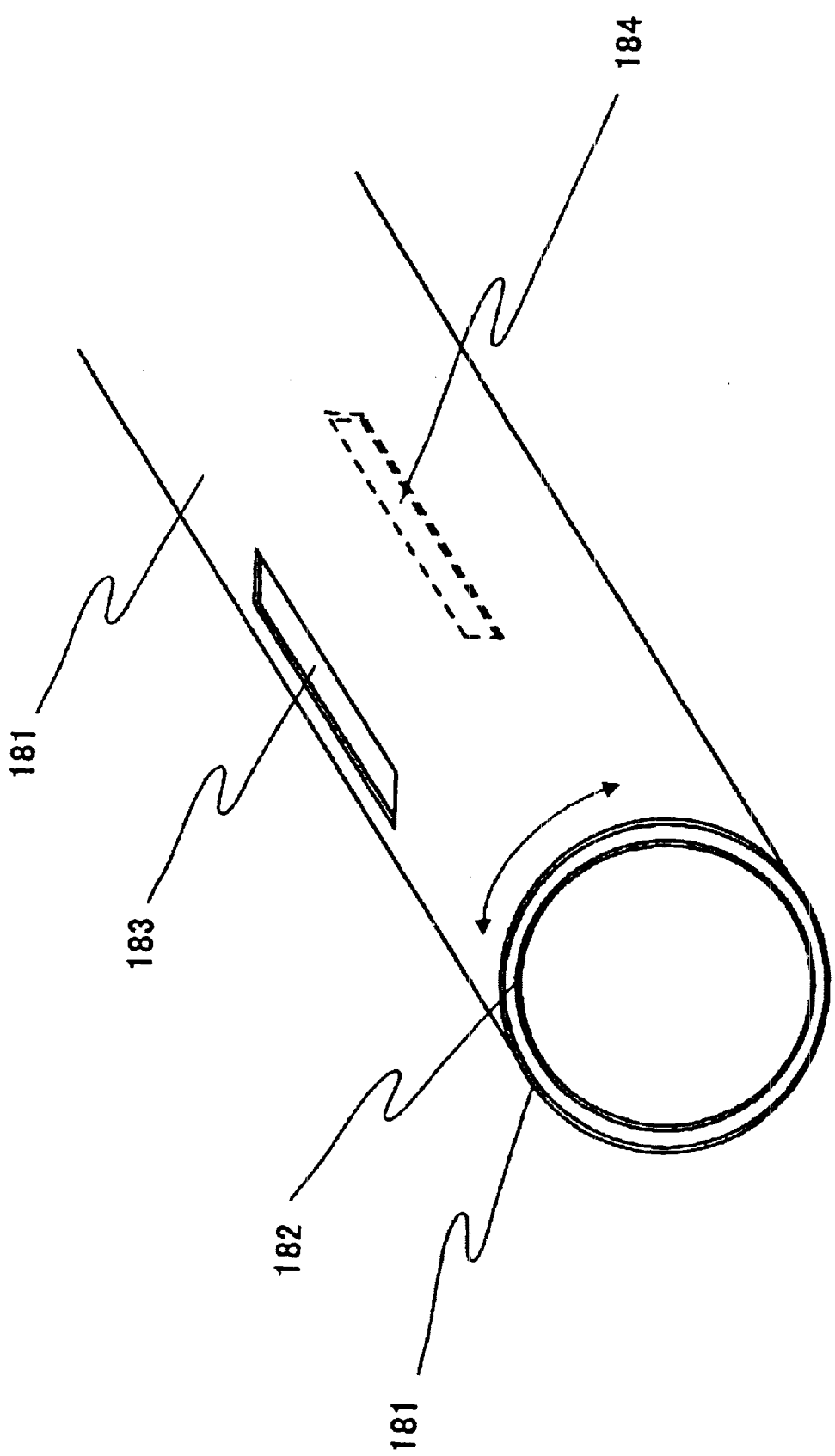
FIG. 16 is a perspective view of another antenna structure in an embodiment of the present invention.

FIG. 16 shows a schematic structure of this sixth embodiment. In this structure, the cylindrical metallic bodies (metallic pipes) 181 and 182 are disposed in a coaxial state or arrangement. Between those metallic pipes is disposed a proper insulator and a spacer (not illustrated) made of an insulator. The metallic pipes are physically separated from each other. The two metallic pipes 181 and 182 can be rotated relatively to each other around the same axis. This rotary axis is positioned in the center of the sectionally-formed circle and prevented from changes of the distance between the pipes when the pipes are rotated.

A slit is formed at each metallic pipe. Concretely, a slit 184 is formed at the inner metallic pipe 182. And, a slit 183 is formed at the outer metallic pipe 181. Those slits function to form slot antennas. An electric power is supplied to those antennas by a proper method, although no power supply line is illustrated here. The distance between the outer and inner metallic pipes 181 and 182 are set to $\lambda/8$ or under with respect to the operation frequency.

In the structure shown in FIG. 16, the outer and inner metallic pipes are rotated relatively to each other. The slot antennas 183 and 184 are aligned in position and shifted from each other. When the slot antennas 183 and 184 are aligned in position, the high-frequency signal/energy is transmitted from one antenna to the other. On the other hand, in case the slot antennas 183 and 184 are not aligned in position as illustrated, a large loss occurs in the transmission of the high-frequency signal/energy from one antenna to the other. Those two antennas can be disposed so as to minimize the transmission loss in case they have a plurality of specific rotation angles respectively. For example, the transmission loss can be minimized when they have rotation angles of 0° and 120° respectively. When this sixth embodiment applies to the computer system in the embodiments 1, 2, and 3, the antennas can be operated normally at the minimized transmission loss while the lid part is closed (angle 0°) and opened (angle 120°).

The structure for transmitting a high-frequency signal/energy in this sixth embodiment can apply, for example, to electrical apparatus provided with a lid part as shown in FIG. 1 respectively. Concretely, the coaxial structure as shown in this sixth embodiment can be employed for the joint between the base unit part and the lid part so as to realize a non-contact transmission structure there.

While this sixth embodiment has been described for an example in which slot antennas (slit antennas) are used, at least one of the antennas may be of another type, such as a dipole antenna. In case a dipole antenna is disposed at the inner cylinder (pipe), the transmission is never changed by its rotation angle. The cylinder may be made of another material other than metal. In such a case, an antenna element may be patterned on the cylinder or the antenna element may be embedded in the cylinder.

While the present invention has been described concretely with reference to some embodiments, the present invention is not limited only to those embodiments; modifications will be apparent to those skilled in the art without departing from the spirit of the invention. For example, while the present invention has been described mainly for a lap-top computer system in the above embodiments, the present invention may also apply to a desk-top and other type computer systems.

Figure 17:
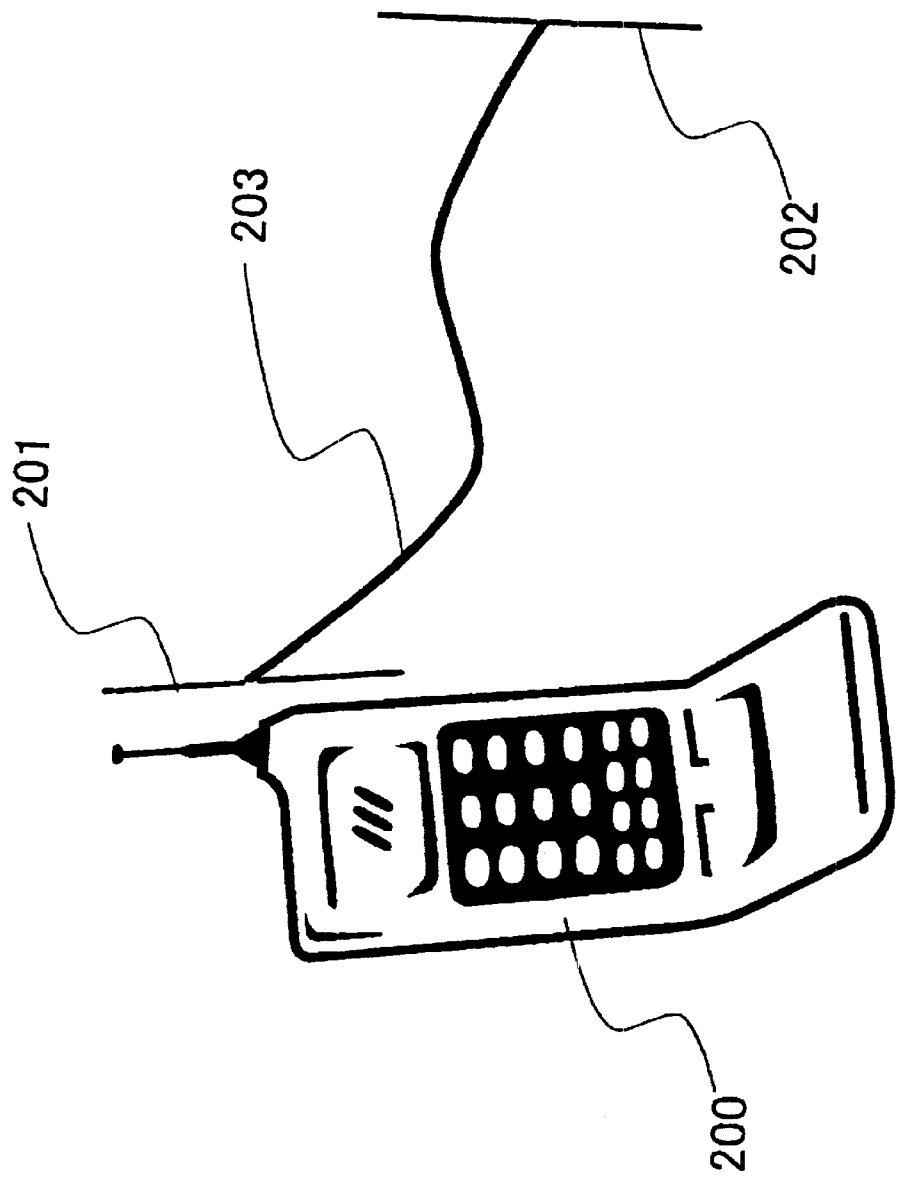
FIG. 17 is a concept chart denoting another example of the present invention.

Furthermore, while the present invention has been described mainly for a computer system in the above embodiments, the present invention may also apply to, for example, a portable telephone (Cellular Phone) 200 as shown in FIG. 17. An auxiliary antenna 201 may be disposed around the antenna of the portable telephone 200 according to the present invention so as to radiate radio waves to external via an external antenna 202 coupled to the auxiliary antenna 201 via a signal cable 203.

Figure 18:
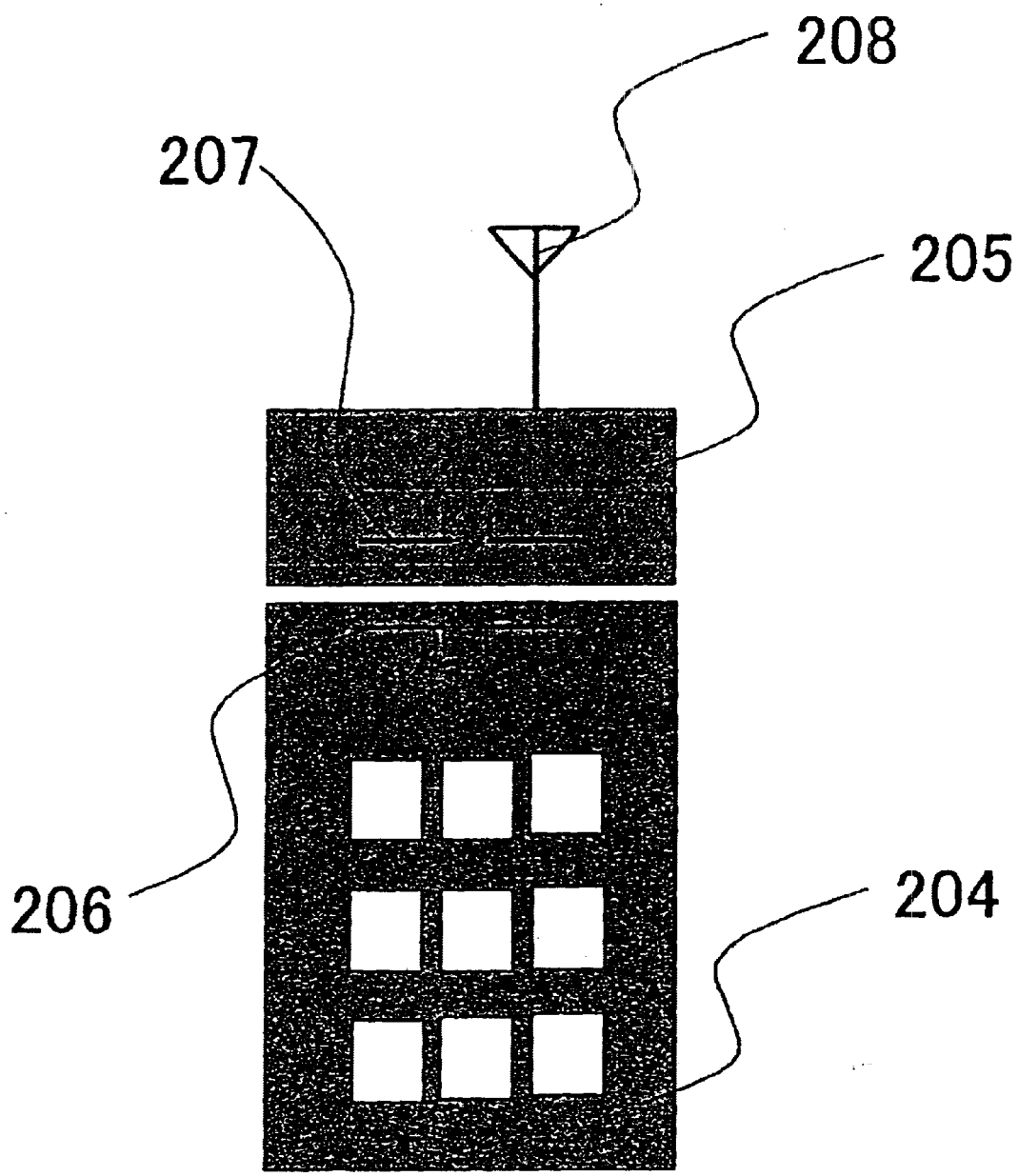
FIG. 18 is a concept chart denoting still another example of the present invention.

Furthermore, as shown in FIG. 18, the present invention may apply to the coupling between a radio device 204 and a booster 205. Concretely, the second antenna 207 built in the booster 205 is disposed so as to face the first antenna 206 built in the radio device 204. The radio device signal from the radio device 204 is transferred to the booster 205 via the first antenna 206 and the second antenna 207 and amplified there, then radiated from the antenna 208 of the booster 205. In such a structure, it is only required to dispose the booster 205 so as to face the radio device 204; neither connection nor any other operation is required.

And, while (½)λ dipole antennas are used as the necessary antennas in the first to third embodiments, the antennas may be other linear antennas such as loop antennas, folded antennas, etc. Slot antennas (slit antennas) and such solid antennas as horn antennas may be used. And, array antennas, such beam antennas as Yagi/Uda antennas may be used.

While the first, second, and third antennas coupled to the radio device in the above embodiments are just one respectively, at least one of those first, second, and third antennas may be plural. For example, there may be two first antennas and two third antennas coupled to the radio device so as to generate no dead angle in the radiation pattern of the high-frequency signal/energy. Each of the first, second, and third antennas may be plural so as to realize diversity disposition.

In the above embodiments, a high-frequency in a GHz band has been used so as to describe the present invention. This is because the present invention availability is higher when a high-frequency in such a GHz band is used. However, in case it is possible to use a longer wavelength and a larger antenna, the high-frequency signal/energy can be used in other frequency bands such as the VHF one, etc.

The typical effects amongst those to be obtained by the present invention disclosed are as follows: It is possible to provide a configuration that is free of such problems as cable damage in a structure required to send/receive a high-frequency signal between a base unit part and a lid part or between the base unit part and a door part. Concretely, the present invention enables a non-contact transmission path to be secured at a low transmission loss. Especially, in a lid or door structure that can be opened and closed, a high-frequency signal or electric power can be transmitted through a non-contact structure without disposing any signal cable at any movable portion. It is thus possible to prevent the increased signal cable transmission loss caused by cable damage and which often occurs when a cable is bent repetitively.

In the drawings and specifications there has been set forth a preferred embodiment of the invention and, although specific terms are used, the description thus given uses terminology in a generic and descriptive sense only and not for purposes of limitation.

We claim as our invention:

1. An apparatus, comprising:
   a first antenna and a second antenna;
   a first member which houses a first circuit and said first antenna, wherein said
   first circuit couples a high-frequency signal to said first antenna, and wherein said first circuit is a circuit selected from the group consisting of: a transmitter, a receiver, and a signal generator; and
   a second member, movably attached to said first member, and to which said second antenna is attached, wherein said second antenna faces said first antenna in at least one engagement position between said second member and said first member, the engagement positions characterized in that:
   the high-frequency signal is coupled between said first antenna and said second antenna, and
   the distance between said first antenna and said second antenna is greater than zero and less than about $\lambda/8$, where $\lambda$ is the wavelength of the high-frequency signal;
   wherein said first member and said second member are rotatably attached by a cylindrical joint, and wherein said first antenna is disposed along the center axis of the cylindrical joint, and wherein said second antenna is disposed coaxially relative to said first antenna.

2. The apparatus according to claim 1,
   wherein the imaginary part of the mutual impedance between said first antenna and said second antenna is about zero.

3. The apparatus according to claim 1,
   wherein said first antenna and said second antenna are antennae selected from the group consisting of: a dipole antenna, a folded antenna, and a slot antenna.

4. The apparatus according to claim 3,
   wherein said second antenna is an electrically floating conductor,
   whereby said second antenna couples an atmospherically traveling electromagnetic wave with said first antenna.

5. The apparatus according to claim 1, wherein said second member further comprises:
   a second circuit, coupled to said second antenna via a signal cable, wherein said second circuit is a circuit selected from the group consisting of: a third antenna, and a signal processer.

6. The apparatus according to claim 1,
   wherein said first antenna is an antenna selected from the group consisting of: a dipole antenna, and a slot antenna, and
   said second antenna is an antenna selected from the group consisting of: a dipole antenna, a folded antenna, and a slot antenna.

7. The apparatus according to claim 6, wherein said second member further comprises:
   a second circuit, coupled to said second antenna via a signal cable, wherein said second circuit is selected from the group consisting of: a third antenna, and a signal processor.

8. An apparatus comprising:
   a first antenna coupled to a first circuit and mounted on a base unit; and
   a second antenna coupled to a second circuit and mounted in a movable member which is pivotally connected to the base unit, wherein said second antenna is electrically floating relative to said first antenna and positioned parallel to and overlapping said first antenna, the movable member being connected to the base unit such that when the movable member pivots about the base unit said second antenna remains parallel to said first antenna and moves along the circumference of a circle formed about an axis defined by said first antenna.

9. The apparatus of claim 8;
   wherein the first circuit is a circuit selected from the group consisting of: a transmitter, a receiver, and a signal generator; and
   wherein the second circuit is a circuit selected from the group consisting of: a third antenna, and a signal processor.

10. The apparatus of claim 9 wherein one of said first antenna and said second antenna is an antenna selected from the group consisting of: a dipole antenna, a folded antenna, and a slot antenna.

11. The apparatus of claim 10 wherein the distance between said first and said second antennas remains within a range which is greater than zero and less than about $0.125\lambda$ where $\lambda$ is the wavelength of the signal coupled between said first and second antennas.

12. The apparatus of claim 11 wherein the distance between said first and said second antennas remains within a range which is greater than or equal to about $0.06\lambda$ and less than about $0.125\ \lambda$.

13. The apparatus of claim 12 wherein the imaginary part of the mutual impedance between said first antenna and said second antenna is about zero.

14. An apparatus comprising:
    a first slot antenna coupled to a first circuit and formed as a hollow within a first tube which is mounted on a base unit; and
    a second slot antenna coupled to a second circuit and formed as a hollow within a second tube which is mounted in a movable member which is pivotally connected to the base unit, wherein said second slot antenna is electrically floating relative to said first slot antenna, the movable member being connected to the base unit such that:

the second tube is concentric to the first tube,
said first and second slot antennas align end to end at both of their respective ends, and
when the movable member pivots about the base unit, said second slot antenna faces said first slot antenna in at least one position.

15. The apparatus of claim 14;
wherein the first circuit is a circuit selected from the group consisting of: a transmitter, a receiver, and a signal generator; and
wherein the second circuit is a circuit selected from the group consisting of: a third antenna, and a signal processor.

16. The apparatus of claim 15 wherein the distance between the first tube and the second tube is greater than zero and less than about $0.125\lambda$ where $\lambda$ is the wavelength of the signal coupled to said first slot antenna.

17. The apparatus of claim 16 wherein the distance between the first tube and the second tube is greater than or equal to about $0.06\lambda$ and less than about $0.125\ \lambda$.

18. The apparatus of claim 17 wherein the imaginary part of the mutual impedance between said first antenna and said second antenna is about zero at the position where said second slot antenna faces said first slot antenna.

* * * * *